(12) United States Patent
Muramatsu

(10) Patent No.: US 8,311,403 B2
(45) Date of Patent: Nov. 13, 2012

(54) IMAGING APPARATUS

(75) Inventor: Koichi Muramatsu, Urayasu (JP)

(73) Assignee: Ricoh Company, Ltd., Tokyo (JP)

( * ) Notice: Subject to any disclaimer, the term of this patent is extended or adjusted under 35 U.S.C. 154(b) by 32 days.

(21) Appl. No.: 12/954,798

(22) Filed: Nov. 26, 2010

(65) Prior Publication Data

US 2011/0129206 A1 Jun. 2, 2011

(30) Foreign Application Priority Data

Nov. 27, 2009 (JP) ................................ 2009-270498

(51) Int. Cl.
*G03B 17/00* (2006.01)
(52) U.S. Cl. ......................................................... 396/55
(58) Field of Classification Search ...................... 396/55
See application file for complete search history.

(56) References Cited

U.S. PATENT DOCUMENTS

| | | | |
|---|---|---|---|
| 5,633,756 A | 5/1997 | Kaneda et al. | |
| 7,643,750 B2 | 1/2010 | Irisawa et al. | |
| 2007/0154195 A1* | 7/2007 | Irisawa et al. | 396/55 |
| 2009/0189987 A1 | 7/2009 | Muramatsu et al. | |
| 2010/0013939 A1 | 1/2010 | Ohno et al. | |
| 2010/0091122 A1 | 4/2010 | Irisawa et al. | |
| 2010/0178044 A1 | 7/2010 | Ohno | |

FOREIGN PATENT DOCUMENTS

| | | |
|---|---|---|
| EP | 1 791 350 A2 | 5/2007 |
| EP | 1 833 242 A2 | 9/2007 |
| JP | 2579035 | 11/1996 |
| JP | 2001-66655 | 3/2001 |
| JP | 3188739 | 5/2001 |
| JP | 2007-102062 | 4/2007 |
| JP | 2007-114485 | 5/2007 |
| JP | 2007-114486 | 5/2007 |
| JP | 2007-274666 | 10/2007 |
| JP | 2008-77047 | 4/2008 |
| JP | 2008-90201 | 4/2008 |
| JP | 2008-187699 | 8/2008 |
| JP | 2008-262151 | 10/2008 |
| JP | 2009-5323 | 1/2009 |
| JP | 2009-170765 | 7/2009 |
| JP | 2009-204629 | 9/2009 |
| JP | 2010-197612 | 9/2010 |
| JP | 2010-231168 | 10/2010 |
| WO | WO /2008/114841 | * 9/2008 |

* cited by examiner

*Primary Examiner* — W. B. Perkey
*Assistant Examiner* — Minh Phan
(74) *Attorney, Agent, or Firm* — Oblon, Spivak, McClelland, Maier & Neustadt, L.L.P.

(57) ABSTRACT

An imaging apparatus includes an optical system, an image pickup device, an image blur correction mechanism, and a holding mechanism having a holding member and a state capable of being switched between a holding state where the holding member is engaged with the image blur correction mechanism so as to mechanically hold the image pickup device and a released state where the engagement of the holding member with the image blur correction mechanism is released, the holding mechanism being set to the holding state when the image blur correction mechanism is not operated. The holding mechanism has a positioning mechanism having an elastic member configured to bias the holding member to position the image pickup device from a held position where the image pickup device is held in the holding state to an original position where the image pickup device is to be electrically held by the image blur correction mechanism. A deviation eliminating operation in which the holding mechanism is set to the released state when the holding mechanism is set to the holding state is executed.

10 Claims, 20 Drawing Sheets ized. That is, the image pickup device is electrically held at the original position by the magnetic force of the permanent magnet and the coil (referred to as electrically holding or electrically holding state, hereinafter). However, in this case, it is necessary to continuously apply electrical current to the coil, and therefore there is room for improvement in reduction of a power consumption.

IMAGING APPARATUS

CROSS REFERENCE TO RELATED APPLICATIONS

The present application is based on and claims priority from Japanese Application Number 2009-270498, filed on Nov. 27, 2009, the disclosure of which is hereby incorporated by reference herein in its entirety.

BACKGROUND OF THE INVENTION

1. Field of the Invention

The present invention relates to an imaging apparatus such as a digital still camera or a digital video camera (referred to as "digital camera", hereinafter) and the like, which has an image blur correction function for correcting image blur when photographing.

2. Description of the Related Art

In an imaging apparatus having a photographing lens system (photographing optical system) configured to image a subject image and an image pickup device (CCD, or the like) configured to receive the subject image obtained through the photographing lens system and to output an image signal, a digital image corresponding to the subject image based on the output image signal is generated. As such an imaging apparatus, recently, a digital camera having a so-called image blur correction function for correcting an image blur occurring when photographing has been in practical use.

As such an image blur correction means, structure in which, for example, the image pickup device such as a CCD or the like is moved in a plane (an X-Y plane) perpendicular to an optical axis (in a Z axis direction) of the photographing optical system is employed (see Japanese Patent Application Publication No. 2001-066655). In the digital camera having the conventional image blur correction function, the CCD as the image pickup device is mounted on a mounting stage provided at an end of a fixation cylinder housing a lens barrel on a photographing optical axis. This mounting stage is provided movably in the X-Y plane perpendicular to the photographing optical axis as the Z axis direction. The mounting stage is movable due to magnetic forces generated by a permanent magnet and a coil facing the permanent magnet. In the conventional digital camera, a camera shake detection sensor detects inclinations in relation to directions of a Y axis and an X axis, respectively and an electrical current applied to the coil is controlled to be changed based on detection outputs of the camera shake detection sensor so that the CCD is moved so as to follow a movement of the subject image due to camera shake.

In the conventional digital camera, an original position is set to a position on the photographing optical axis (Z axis) within a movable range of the mounting stage on which the CCD is mounted. The CCD is moved to follow the movement of the subject image due to camera shake on a basis of the original position as a reference position so that an appropriate image blur correction can be achieved while degrade of the image is prevented. Therefore, when the image blur correction is started, it is preferable that the CCD is positioned at the original position. At this time, the movable range of the mounting stage is essentially finite and therefore the original position as the reference position is set to be matched with a center position of the movable range of the mounting stage so that a wider range image blur correction can be achieved.

When the image blur correction is not operated, it is possible that the CCD is constantly positioned to the original position, that is, the center position of the mounting stage by use of the magnetic force of the permanent magnet and the coil. That is, the image pickup device is electrically held at the original position by the magnetic force of the permanent magnet and the coil (referred to as electrically holding or electrically holding state, hereinafter). However, in this case, it is necessary to continuously apply electrical current to the coil, and therefore there is room for improvement in reduction of a power consumption.

In the camera having the image blur correction function, it is proposed that the mounting stage is mounted on a back surface of the fixation cylinder by use of a pitch coil spring so as to movable in the X-Y plane. In this case, a position in which a spring force of the pitch coil spring and a force of gravity on the mounting stage are equal to each other is set to a starting position of the image blur correction. That is, the image pickup device is mechanically held at a held position by a biasing force of the spring, or the like (referred to as mechanically holding or mechanically holding state, hereinafter) (see Japanese Patent Number 3188739). In this case, the mechanically holding is constantly performed and after a holding state of the image pickup device is changed from the mechanically holding to the electrically holding, the CCD is moved so as to follow the camera shake by use of the magnetic force of the permanent magnet and the coil. Since it is difficult to position the CCD so as to completely match the held position by the mechanically holding with the original position, it is possible that the image is deviated when the holding state is changed from the mechanically holding to the electrically holding to start the image blur correction.

It is also possible that the imaging apparatus having the image blur correction function has a forcibly-holding mechanism for mechanically holding and fixing the image pickup device at the original position (see Japanese Patent Application Publication Number 2007-102062). In this case, the power consumption can be reduced and the image deviation does not basically occur when the image blur correction starts. However, when unexpected large impact or shock is given in the mechanically holding state, the CCD is deviated from the original position and therefore it is possible that the image is deviated for a moment when the holding state is changed from the mechanically holding to the electrically holding.

Furthermore, it is possible that the imaging apparatus has the image blur correction function in which a position of the image pickup device in the electrically holding is changed in accordance with a position of the image pickup device in the mechanically holding (see Japanese Patent Number 2579035. In this case, the imaging apparatus has a means for memorizing the mechanical held position. Every time when a releasing operation and holding operation, the electrically held position of the image pickup device is changed to a position corresponding to the mechanically held position and therefore the image deviation occurring when the holding state is changed from the mechanically holding to the electrically holding is suppressed.

However, since the electrically held position is changed and therefore the starting position of the image blur correction operation, that is, the original position is changed, the original position is off from a position on the photographing optical axis (Z axis) so that it is possible that the image quality is degraded.

SUMMARY OF THE INVENTION

The present invention is mainly to provide an imaging apparatus for preventing the image deviation from occurring while the power consumption is reduced, without degrading image quality.

In order to achieve the above objects, an imaging apparatus includes a photographing optical system configured to image a subject image, an image pickup device configured to obtain the subject image as electrical signals, an image blur correction mechanism configured to control an applied current so as to position and electrically hold the image pickup device at an arbitrary position in a plane perpendicular to an optical axis of the photographing optical system to correct image blur, a holding mechanism having a holding member, the holding mechanism having a state capable of being switched between a holding state where the holding member is engaged with the image blur correction mechanism so as to mechanically hold the image pickup device by mechanically controlling a movement of the image pickup device and a released state where the engagement of the holding member with the image blur correction mechanism is released, the holding mechanism being set to the holding state when the image blur correction mechanism is not operated, and a controller configured to control the image blur correction mechanism and the holding mechanism. The holding mechanism has a positioning mechanism having an elastic member configured to bias the holding member to position the image pickup device from a held position where the image pickup device is held in the holding state to an original position where the image pickup device is to be electrically held by the image blur correction mechanism. The controller executes a deviation eliminating operation in which the holding mechanism is set to have the released state when the imaging apparatus is actuated and thereafter the holding mechanism is set to the holding state.

DETAILED DESCRIPTION OF THE PREFERRED EMBODIMENTS

Hereinafter, preferred embodiments of this invention will be described in detail based on the drawings.

Figure 2:
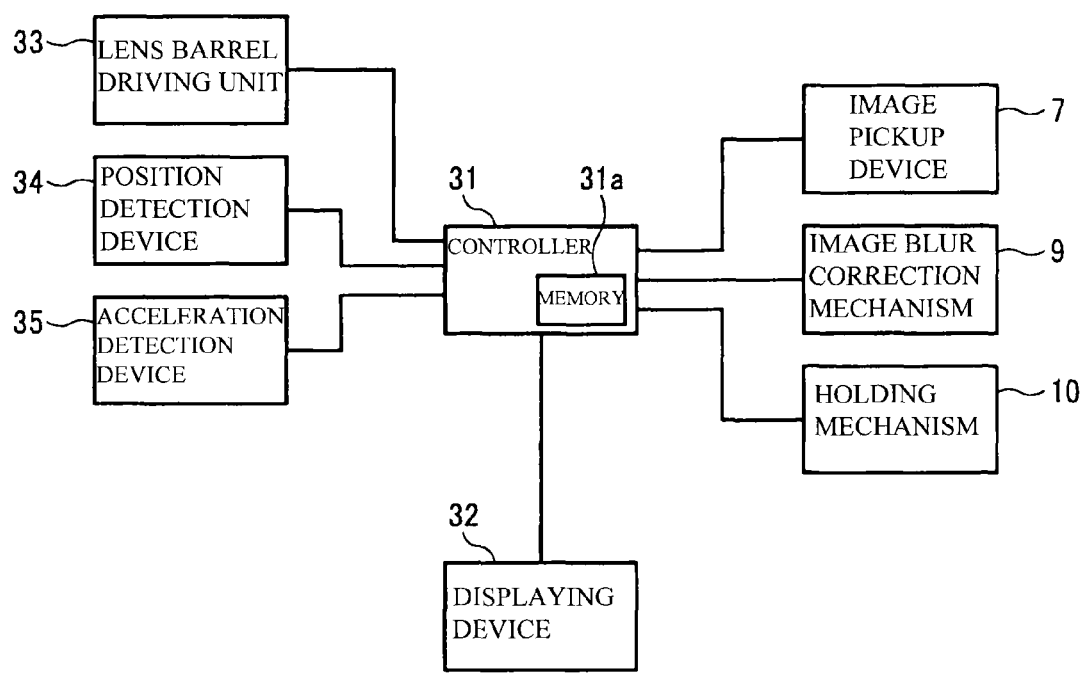
FIG. 2 is an explanatory view showing a control block in the digital camera.

An imaging apparatus according to an embodiment of the present invention includes, for example, as shown in FIG. 2, a photographing optical system 3 configured to image a subject image, an image pickup device 7 configured to obtain the subject image as electrical signals, and an image blur correction mechanism 9 configured to control an applied current so as to position and electrically hold the image pickup device at an arbitrary position in a plane perpendicular to an optical axis of the photographing optical system to correct image blur.

The imaging apparatus further includes a holding mechanism 10 having a holding member 22, the holding mechanism 10 having a state capable of being switched between a holding state where the holding member 22 is engaged with the image blur correction mechanism 9 so as to mechanically hold the image pickup device by mechanically controlling a movement of the image pickup device to and a released state where the engagement of the holding member 22 with the image blur correction mechanism 9 is released, the holding mechanism 10 being set to the holding state when the image blur correction mechanism 9 is not operated and a controller configured to control the image blur correction mechanism 9 and the holding mechanism 10. The holding mechanism 10 has a positioning mechanism having an elastic member 27 configured to bias the holding member 22 to position the image pickup device from a held position where the image pickup device is held in the holding state to an original position where the image pickup device is to be electrically held by the image blur correction mechanism 9. The controller executes a deviation eliminating operation in which the holding mechanism 10 is set to the released state when the imaging apparatus is actuated and thereafter the holding mechanism 10 is set to the holding state.

Example 1

Figure 3:
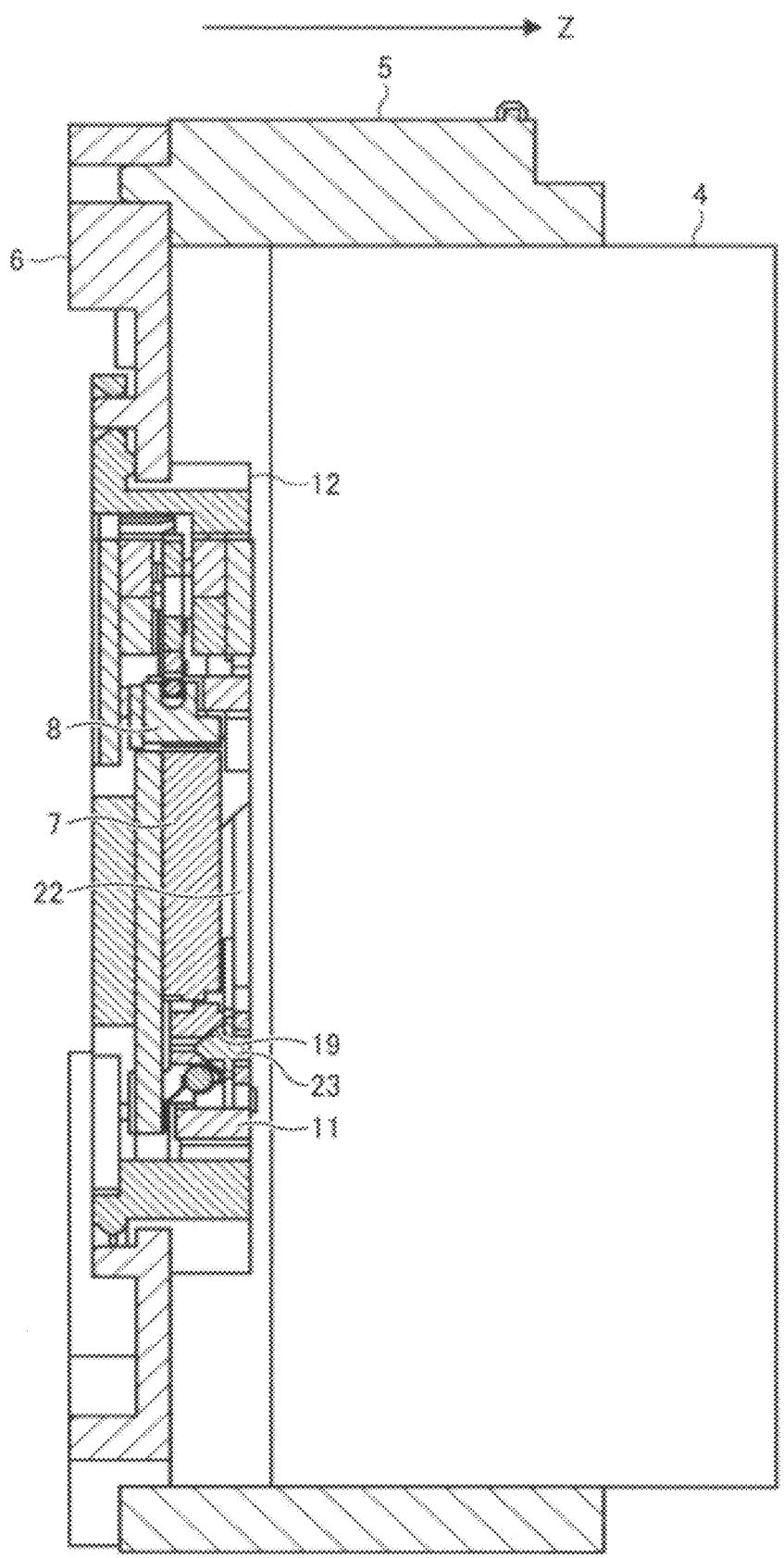
FIG. 3 is an explanatory view schematically showing a state where a lens barrel is housed at a collapsed position in a lens barrel housing cylinder.
Figure 4:
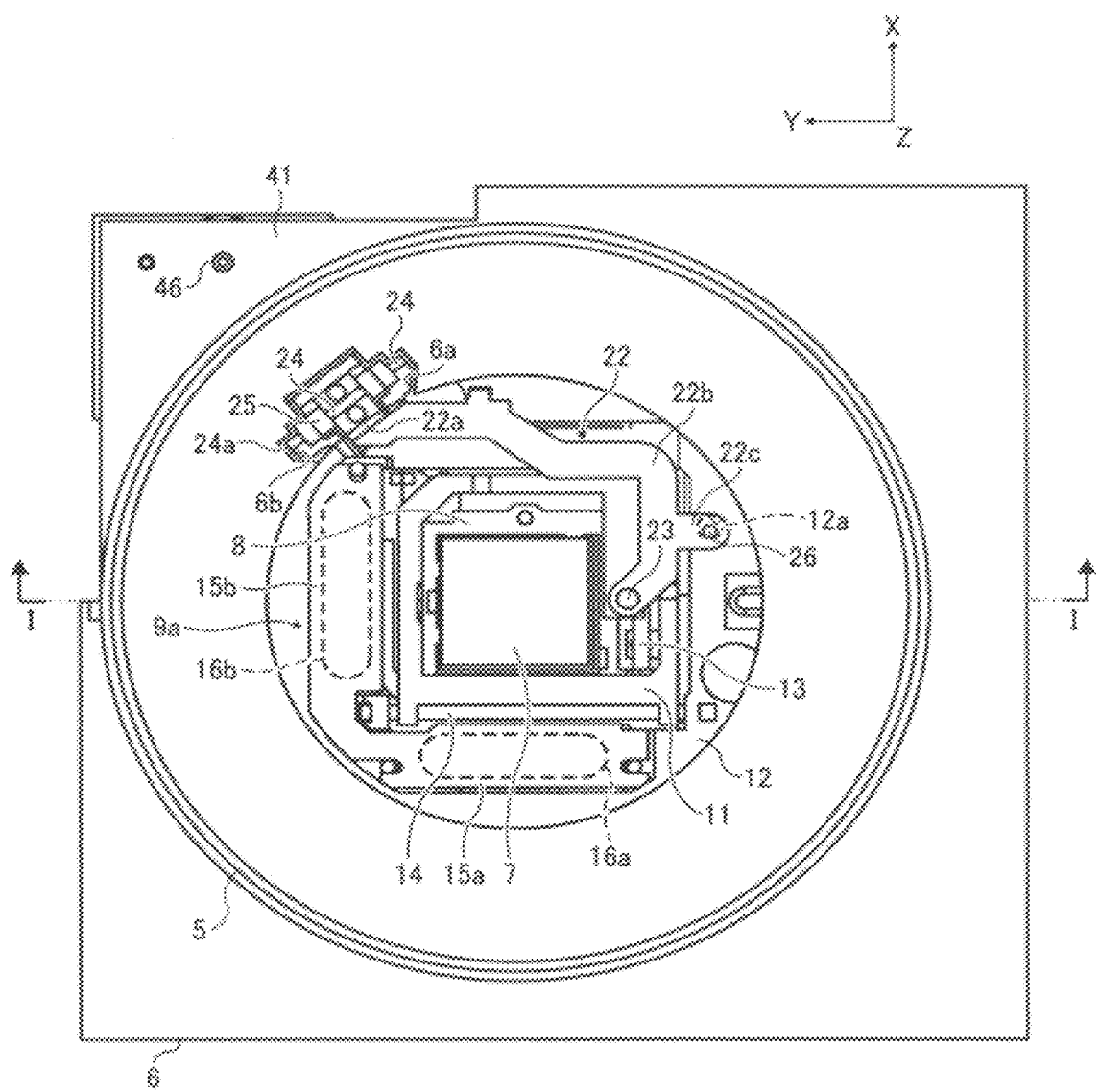
FIG. 4 is a front view showing a base plate at a side of the lens barrel housing cylinder.

A digital camera 1 as Example 1 of the imaging apparatus according to the present invention will be explained with reference to FIGS. 1 to 17. FIG. 3 shows a sectional view obtained along a line I-I shown in FIG. 4. In FIG. 4, a lens barrel 4 in a lens barrel housing cylinder 5 is omitted.

The digital camera 1 has a photographing optical system 3 configured to image a subject image, an image pickup device 7 configured to obtain the subject image as electrical signals, and an image blur correction mechanism 9 configured to control an applied current so as to position and electrically hold the image pickup device at an arbitrary position in a plane perpendicular to an optical axis of the photographing optical system to correct image blur.

That is, the digital camera has an image blur correction function in which the image pickup device is moved in the plane perpendicular to the optical axis so as to correct an image blur.

Figure 1:
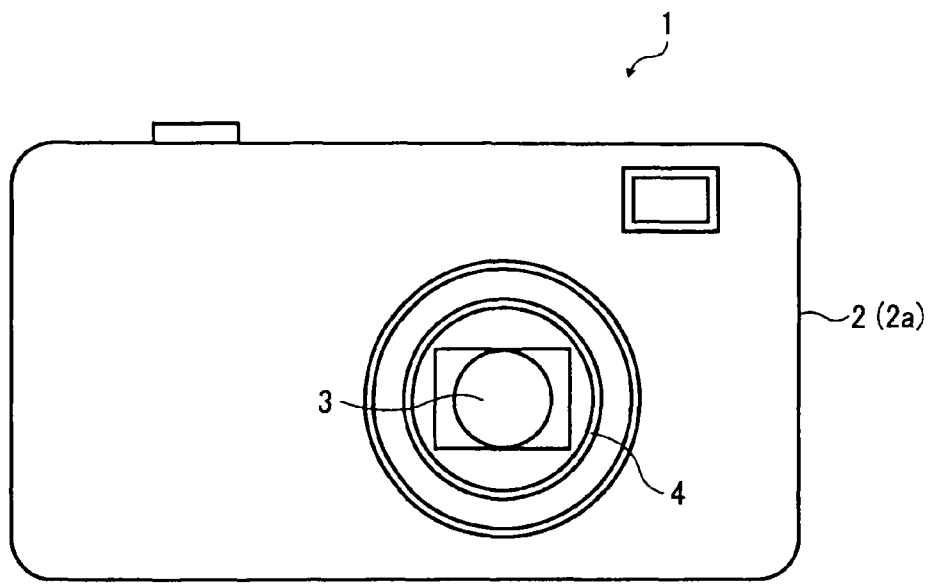
FIG. 1 is a front view showing a digital camera as an example of an imaging apparatus according to an embodiment of the present invention.

The digital camera 1 includes, as shown in FIG. 1, a camera body 2 (body case 2a), and a lens barrel 4 on which a photographing lens system 3 as the photographing optical system at a front side of the camera body. The photographing lens system 3 includes a fixed lens, a zoom lens, a focus lens, and the like which are not shown in the drawings. The lens barrel 4 is disposed movably between a predetermined collapsed position and a predetermined photographing standby position along the optical axis of the photographing lens system 3 (referred to as "optical axis", hereinafter). In the lens barrel 4, a shutter unit, an aperture unit, and the like which are not illustrated are also provided. Hereinafter, a direction of the optical axis is referred to as a Z direction and a plane perpendicular to the Z axis is referred to as an X-Y plane.

The digital camera 1 has, as shown in FIG. 2, a controller 31 configured to process image data based on output signals from the image pickup device 7 and to control overall the image blur correction mechanism 9, the holding mechanism 10, and a lens barrel driving unit 33 described later, and the like. Furthermore, the imaging apparatus may have a position detection device 34 configured to detect a position of the image pickup device, an acceleration detection device 35 configured to detect a change in a movement speed of the imaging apparatus, and a displaying device 32 configured to display an image based on the subject image obtained by the image pickup device. The controller 31 configured to appropriately display the image obtained by the image pickup device 7 through the photographing lens system 3 on the display device 32 (see FIG. 17) provided at a rear surface side of the camera body 2. The controller 31 receives detection outputs from the position detection device 34 or the acceleration detection device 35 as a camera shake detection device. The position detection device is configured to detect a position of an image pickup device holding frame as a frame member 8 described later and a sliding frame as a frame member 11, and in Example 1, configured by a Hall element and provided on the image pickup device holding frame 8 and the sliding frame 11, respectively. The camera shake detection device 35 is configured to detect camera shake occurring in the digital camera 1 itself (the camera body 2 (the camera body case 2a)) and in Example 1, configured by a gyro sensor and provided on the camera body 2 (camera body case 2a). An acceleration sensor may be used as the camera shake detection device 35.

The lens barrel 4 is, as shown in FIG. 3, provided at an inner side of the lens barrel housing cylinder 5. On an outer circumferential surface of the lens barrel 4, helicoidal cam followers which are not illustrated are formed. The image blur correction mechanism 9 may have the frame member 8 configured to movably hold the image pickup device 7 in the plane perpendicular to the optical axis, the frame member 8 having an engagement hole 19, a base plate 6 configured to movably hold the frame member 8 in the plane perpendicular to the optical axis, an electrical magnet 16a, 16b provided on one of the base plate 6 and the frame member 8, and a permanent magnet 15a, 15b provided on the other one of the base plate 6 and the frame member 8. The lens barrel housing cylinder 5 is integrally formed with the base plate 6 at a front side thereof provided in the camera body 2. The lens barrel housing cylinder 5 has an inner circumferential surface on which not-illustrated helicoidal cam grooves are formed and the cam grooves are configured to be engaged with the cam followers of the outer circumferential surface of the lens barrel 4 installed in the lens barrel housing cylinder. In the lens barrel housing cylinder 5, the lens barrel 4 is moved between the predetermined collapsed position and the predetermined photographing standby position (see FIG. 14) in a direction of the optical axis (Z axis) by a driving force of the lens barrel driving unit 33 (see FIG. 2).

Figure 5:
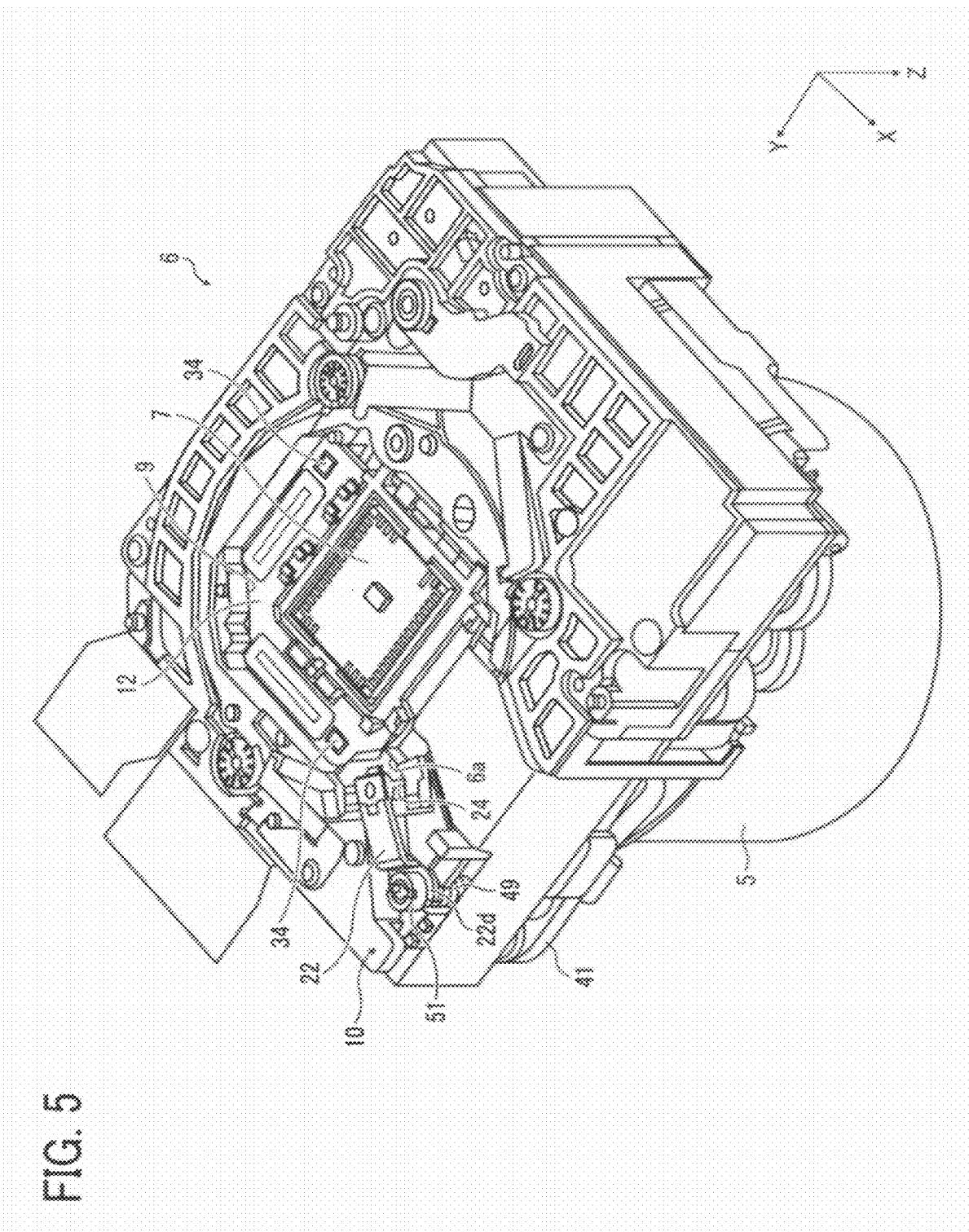
FIG. 5 is a perspective view showing the base plate at a back side (opposite side to the side of the lens barrel housing cylinder).
Figure 6:
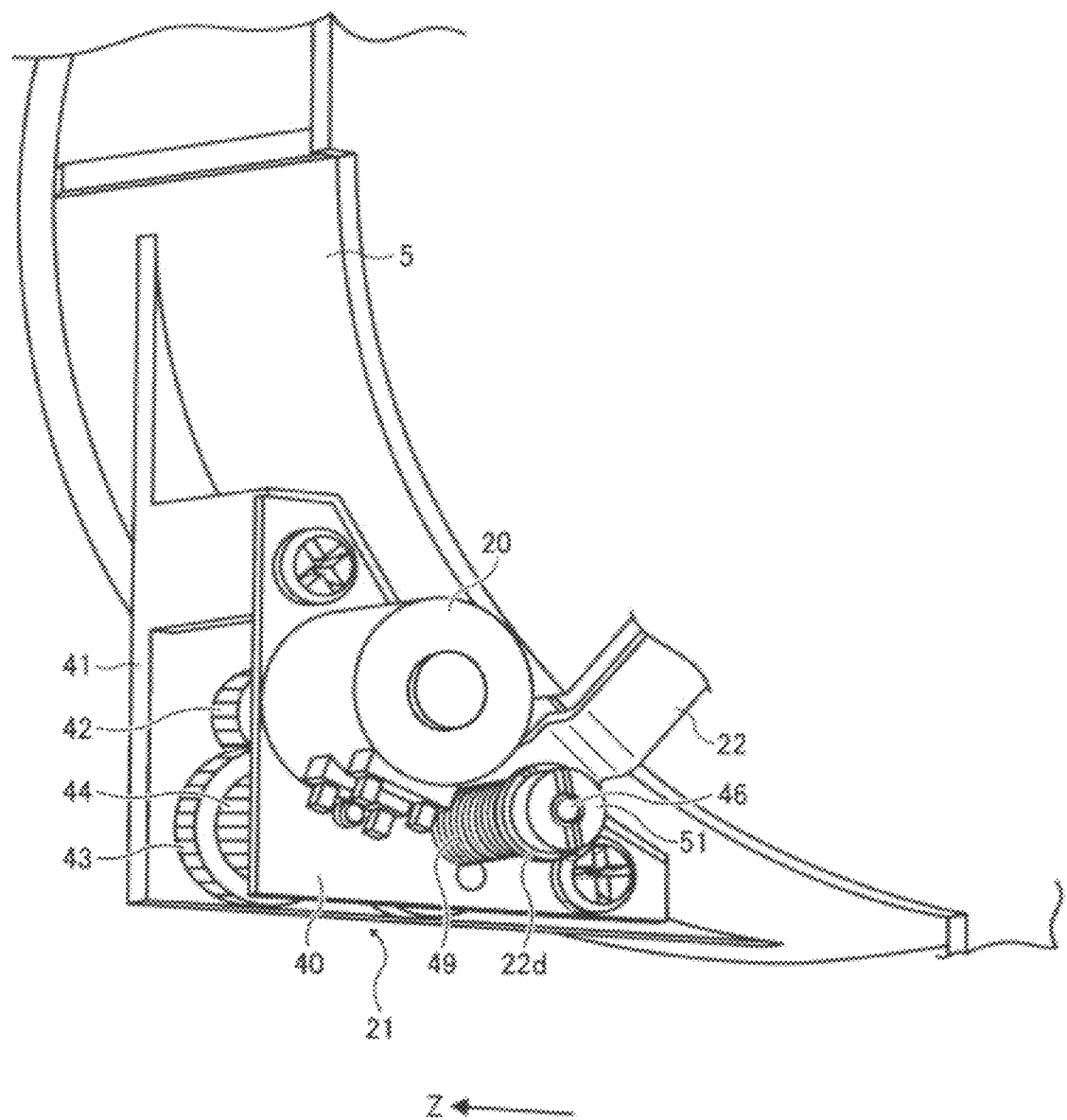
FIG. 6 is a perspective view explaining a holding mechanism and showing a part of an appearance of the lens barrel housing cylinder.

As shown in FIGS. 4 and 5, on a surface of the base plate 6 positioned at a center part in the lens barrel housing cylinder 5, the image pickup device holding frame 8 holding the image pickup device 7 such as a CCD or the like, the image blur correction mechanism 9 correcting image blur by moving the image pickup device holding frame 8, that is, the image pickup device 7 in the plane perpendicular to the optical axis, and the holding mechanism 10 mechanically controlling a movement of the image pickup device holding frame 8 in a direction perpendicular to the optical axis and holding the image pickup device holding frame 8.

(Configuration of Image Blur Correction Mechanism 9)

The image blur correction mechanism 9 has the sliding frame 11 movably holding the image pickup device holding frame 8. The image pickup device holding frame 8 is held movably in the X axis direction (upward and downward directions in FIG. 4) by slidably inserting a guide bar 13 provided on the sliding frame 11 into the image pickup device holding frame 8. Furthermore, the image pickup device holding frame 8 is movably held by a guide bar at an opposite side (in the Y axis direction) across the image pickup device 7 in relation to the guide bar 13.

The sliding frame 11 is movably held inside a slidably-holding frame as a frame member 12 provided on the base plate 6 in the lens barrel housing cylinder 5. The sliding frame 11 is held movably in the Y axis direction (left and right directions in FIG. 4) by slidably inserting a guide bar 14 provided on the slidably-holding frame 12 into the sliding frame 11. Furthermore, the sliding frame 11 is held movably by a guide bar at an opposite side (the X axis direction) across the image pickup device in relation to the guide bar 14, although not being illustrated in the drawings.

On a surface of the slidably-holding frame 12, yokes as the permanent magnets 15*a*, 15*b* integrally formed with the not-illustrated permanent magnet are provided. The yokes 15*a*, 15*b* are adjacent to the sliding frame 11 in the Y axis or X axis directions. On back surface sides of the yokes 15*a*, 15*b*, coils as the electrical magnets 16*a*, 16*b* are provided so as to face the yokes 15*a*, 15*b* in the Z axis direction, respectively. The coil 16*a* is fixed at a projection part provided on the sliding frame 11, and the coil 16*b* is fixed at a projection part provided on the image pickup device holding frame 8, although not being illustrated in the drawings.

In the image blur correction mechanism 9, attraction repulsive forces due to magnetic forces generated in each coil 16*a*, 16*b* and magnetic forces of the yokes 15*a*, 15*b* (and the permanent magnets integrally formed therewith) are appropriately given to move the image pickup device holding frame 8 in the X axis direction and the sliding frame 11 in the Y axis direction, respectively. On the image pickup device holding frame 8 and the sliding frame 11, as described above, the position detection device 34 for detecting the positions of the image pickup device holding frame 8 and the sliding frame 11 is provided.

In the image blur correction mechanism 9, under the control of the controller 31, based on detection information detected by the above-described camera shake detection device 35 (see FIG. 2), electrical current applied to each coil 16*a*, 16*b* is controlled. By the control, the attraction repulsive forces due to the magnetic forces are appropriately given between the respective coil 16*a*, 16*b* and the respective yoke 15*a*, 15*b* (the permanent magnet integrally formed with the yoke). By the attraction repulsive forces, the image pickup device holding frame 8 is moved in the X axis direction and the sliding frame 11 is moved in the Y axis direction so as to cancel or eliminate image blur. At this time, in the image blur correction mechanism 9 (controller 31), the original position in the X-Y plane is set in the image pickup device holding frame 8. A movement target position is set based on the detection information from the camera shake detection device 35 (see FIG. 2) and a movement direction and a movement amount from the original position to the movement target position is calculated, and then the image pickup device holding frame 8 is moved by the movement amount in the movement direction. In the image blur correction mechanism 9, since the movement is obtained by use of the attraction repulsive forces due to the magnetic forces, servocontrol is performed based on the position information from the position detection device 34 (see FIG. 2) so as to appropriately move the image pickup device holding frame 8 to the set movement target position. Furthermore, a state where a position of the image pickup device holding frame 8 is controlled in the X-Y plane by the attraction repulsive force due to the magnetic force, that is, a state where the image pickup device holding frame 8 is positioned to an arbitral position in the X-Y plane by controlling electrical current applied to each coil 16*a*, 16*b*, is referred to as electrical holding.

In the image blur correction mechanism 9, the original position in the above described electrical holding is set so as to be matched with the center position within the movable range in the X-Y plane by the sliding frame 11 and the slidably-holding frame 12 so as to move the image pickup device holding frame 8 independently from the movement direction in the X-Y plane. This is because the image pickup device holding frame 8 holding the image pickup device 7 is held by the sliding frame 11 movably in the X axis direction (upward and downward directions in FIG. 4) and the sliding frame 11 is held by the slidably-holding frame 12 movably in the Y axis direction (left and right directions in FIG. 4), that is, the image pickup device holding frame 8, that is, the image pickup device 7 cannot be moved in an infinite range. Furthermore, the above described original position is positioned on the optical axis (the optical axis of the photographing lens system 3) in order to prevent the image from being degraded in the image blur correction mechanism 9. Therefore, in the image blur correction mechanism 9, in the electrical holding, the image pickup device holding frame 8, that is, the image pickup device 7 is moved in the X-Y plane so as to cancel or eliminate the image blur with the original position on the optical axis as a reference position to correct image blur. The original position is stored in a memory device 31*a* (see FIG. 2) provided in the controller 31 and appropriately obtained by the controller 31. Therefore, in the digital camera 1, that is, the image blur correction mechanism 9, the controller 31 controls the electrical current applied to each coil 16*a*, 16*b* based on data about the original position stored in the memory device 31*a* (see FIG. 2). Accordingly, it is possible that in the electrical holding, the image pickup device holding frame 8, that is, the image pickup device 7 is moved to the original position set on the optical axis and that the image pickup device 7 is maintained to be in the original position.

Furthermore, the image blur correction mechanism 9 may have an engagement hole 19, the holding member 22 may have a fixing pin 23 configured to be engaged with the engagement hole 19 and a holding-member moving device 20, 21 configured to move the holding member 22 so that the fixing pin 23 is separated from the engagement hole 19 in the released state.

Figure 9:
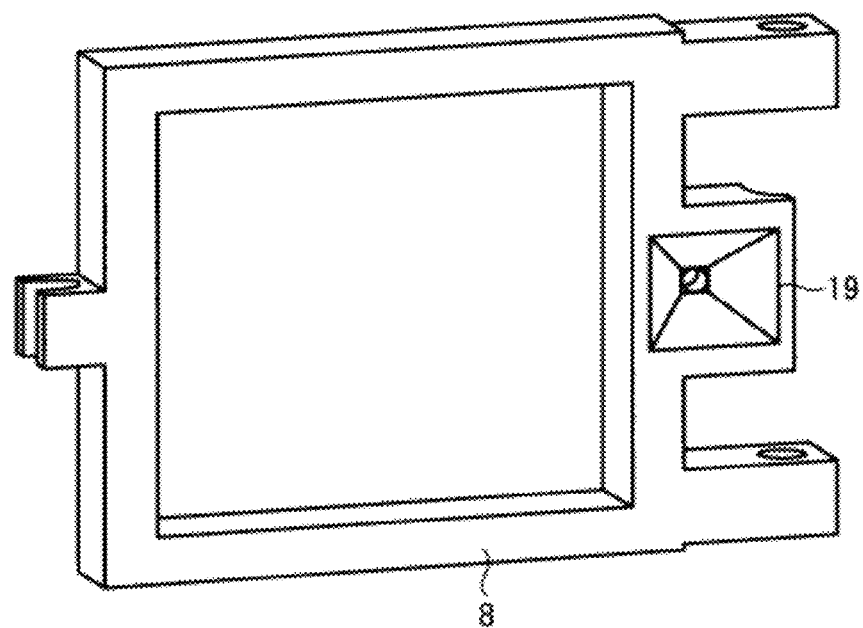
FIG. 9 is a perspective view showing an image pickup device holding frame of the digital camera.
Figure 10:
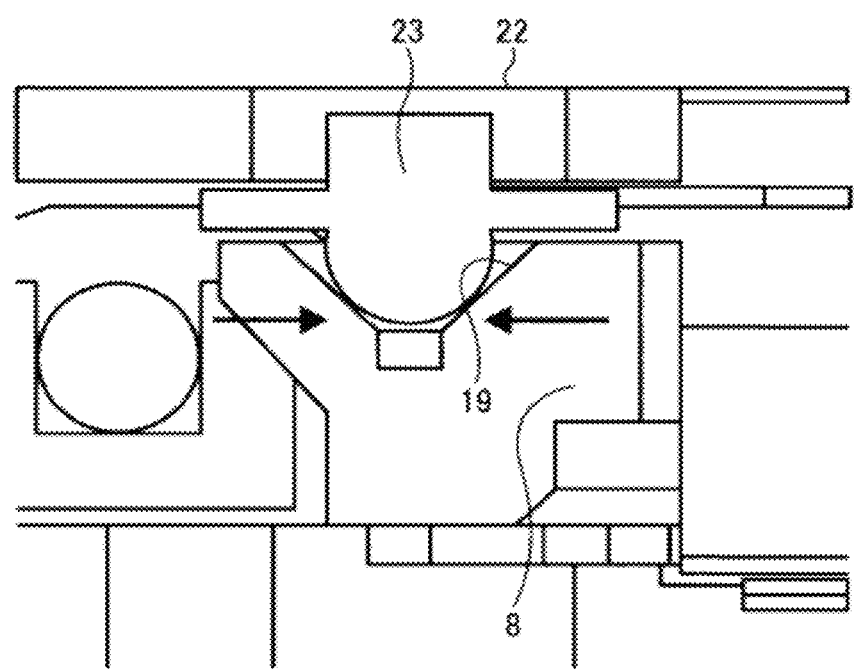
FIG. 10 is an explanatory view showing a state where a fixing pin of the fixation lever is engaged with an engagement hole of the image pickup device holding frame.

On a front surface side of the image pickup device holding frame 8 (on a front surface side of the image pickup device 7), the engagement hole 19 configured to be detachably engaged with the fixing pin 23 provided at an end of a fixation lever described below as the holding member (see FIG. 3) is formed. The engagement hole 19 may be, as shown in FIG. 9, a rectangular opening end at the front surface side (object side) of the image pickup device holding frame 8 and have inclined surfaces so as to gradually reduce a sectional area to form a bottom surface having a reduced area (see FIGS. 9 and 10). The opening end at the front surface side of the engagement hole 19 is set to have a dimension such that, even when the image pickup device holding frame 8 is positioned at any position within the movable range, as described below, the fixing pin 23 of the fixation lever 22 positioned in the X-Y plane by a bias of a torsion spring 27 as the elastic member has contact with the above described inclined surface.

(Configuration of Holding Mechanism 10)

The holding mechanism 10 includes, as shown in FIGS. 5 to 8, 11, and 12, a driving motor 20 as the holding-member moving device, a reciprocating mechanism 21 as the holding-member moving device configured to convert a rotational movement into a linearly reciprocating movement of the driving motor 20, a thin plate-like fixation lever 22 configured to oscillate due to the reciprocating movement of the reciprocating mechanism 21, and the fixing pin 23 provided at the end of the fixation lever 22 so as to be detachably engaged with the engagement hole 19.

The driving motor 20 is configured to be controlled and driven by the control of the movement of the fixation lever 22 so as to appropriately rotate and is configured by a stepping motor in Example 1. The driving motor 20 is held by a motor holding plate 40 (see FIG. 6). The motor holding plate 40 is attached and fixed to a flange 41 integrally formed with the outer circumferential surface of the lens barrel housing cylinder. On a not-illustrated motor shaft (output shaft) of the driving motor 20, an output gear 42 (see FIG. 7) is attached and fixed, and the reciprocating mechanism 21 is connected to the output gear 42 (see FIG. 7).

Figure 11:
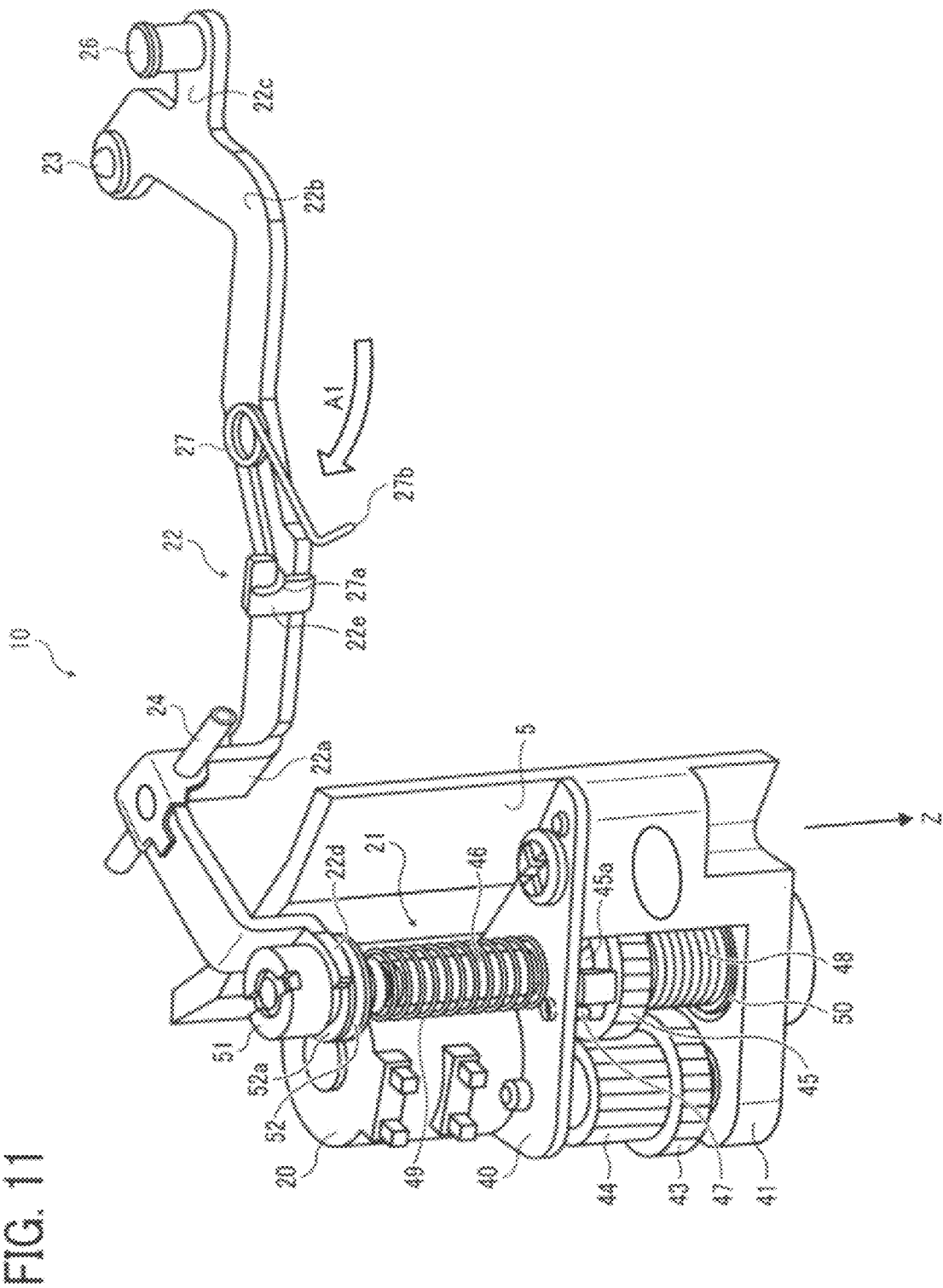
FIG. 11 is an explanatory view as a perspective view schematically showing a holding mechanism.
Figure 12:
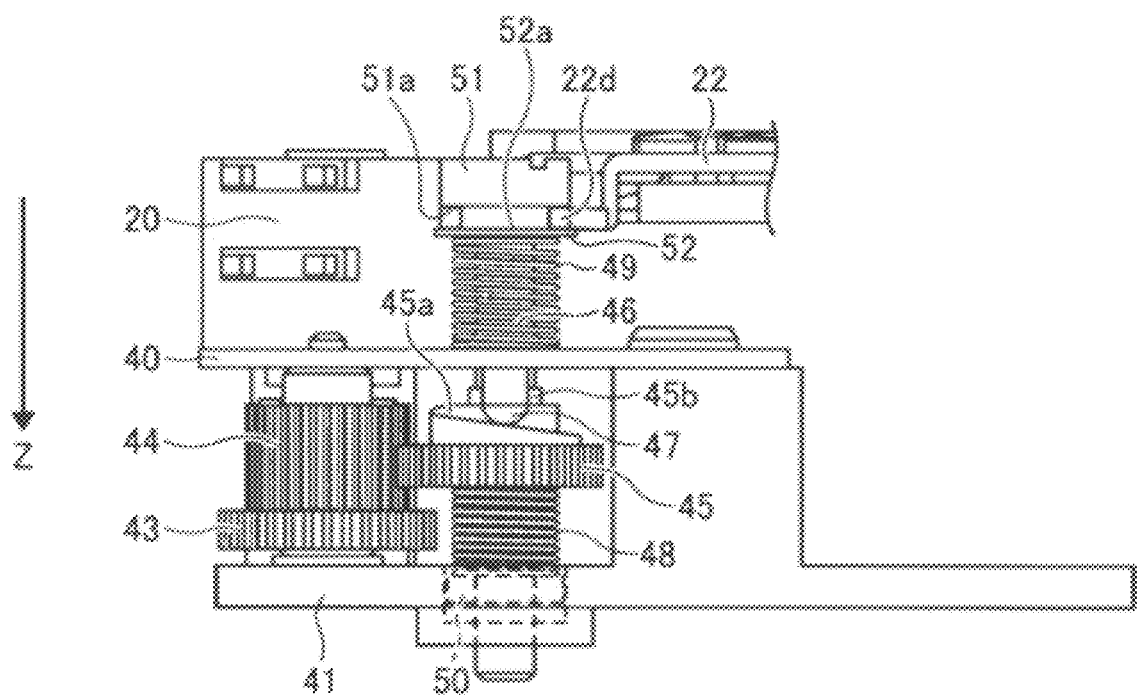
FIG. 12 is an explanatory view as a side view schematically showing the holding mechanism.

The reciprocating mechanism 21 includes, as shown in FIG. 11, a rotation transmitting gear 43, a transmitting gear 44, a cam gear 45, an operating shaft 46, a cam follower 47, a first coil spring 48, and a second coil spring 49. The rotation transmitting gear 43 is engaged with the output gear 42 (see FIG. 7) attached and fixed to the motor shaft (output shaft) of the driving motor 20. The transmitting gear 44 is coaxially provided and integrally formed with the rotation transmitting gear 43. The cam gear 45 has a cam surface 45a at a side facing the motor holding plate 40 and is engaged with the transmitting gear 44. The operating shaft 46 is inserted into a shaft hole of the cam gear 45 and disposed along the optical axis (Z axis), that is, in the Z axis direction (upward and downward directions in FIGS. 11 and 12). The cam follower 47 is provided on the motor holding plate 40 so as to have contact with or abut on the cam surface 45a of the cam gear 45. The first coil spring 48 is provided so as to surround a circumferential surface of the operating shaft 46 at one end (lower side of FIGS. 11 and 12). The second coil spring 49 is provided so as to surround a circumferential surface of the operating shaft 46 at the other end (upper side of FIGS. 11 and 12).

The operating shaft 46 is held movably in the optical axis direction on the flange 41 at the one end (lower side of FIGS. 11 and 12) and held movably in the optical axis direction on the motor holding plate 40 at a vicinity of an intermediate part.

Figure 13A:
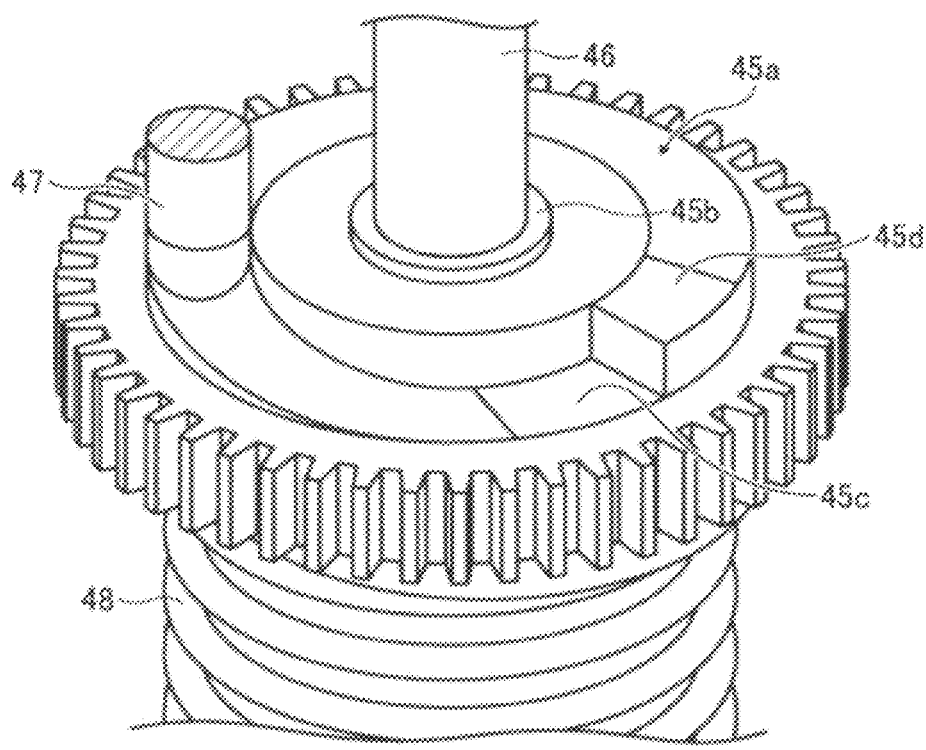
FIG. 13A is a schematic perspective view explaining a configuration of a cam gear and a cam surface of the cam gear.

The cam surface 45a of the cam gear 45 is, as shown in FIG. 13A, formed, while surrounding the operating shaft 46, as an inclined surface with a gradually changed height in an extending direction of the operating shaft 46. The cam follower 47 extends and projects toward the one end (lower side of FIGS. 11 and 12) of the operating shaft 46 from the motor holding plate 40 so as to face the cam surface 45a in the extending direction (optical axis direction) of the operating shaft 46. The cam gear 45 is provided movably in the extending direction of the operating shaft 46 inserted into the shaft hole. A receiving part 45b (see FIGS. 12 and 13A) formed at a side of the motor holding plate 40 has contact with or abuts on the motor holding plate 40 so that the movement toward the other end (upper side of FIGS. 11 and 12) of the operating shaft 46 is controlled. A spring stop member 50 is attached and fixed to the one end (lower side of FIGS. 11 and 12) of the operating shaft 46 and stops a spring of the first coil spring 48 movably provided along the operating shaft 46. The cam gear 45 is biased by the first coil spring 48 provided on the operating shaft 46 toward the motor holding plate 40. Thereby, the cam surface 45a of the cam gear 45 has constantly contact with or abuts on the cam follower 47.

At the other end of the operating shaft 46, the lever receiving member 51 is attached and fixed. The second coil spring 49 provided at a lower part of the lever receiving member 51, that is, at the other end side of the operating shaft 46 (upper side of FIGS. 11 and 12) is stopped by the motor holding plate 40 and the spring receiving member 52 is provided at the other end side. The spring receiving member 52 is a cylindrical member surrounding the operating shaft 46 and is provided movably relative to the operating shaft 46. Therefore, the spring receiving member 52 is constantly biased by the second coil spring 49 toward the other end (upper side of FIGS. 11 and 12) of the operating shaft 46. An upper surface 52a of the spring receiving member 52 faces a lower surface 51a of the lever receiving member 51 in the extending direction of the operating shaft 46. Furthermore, a biasing force of the first coil spring 48 is set to be larger than that of the second coil spring 49.

Figure 7:
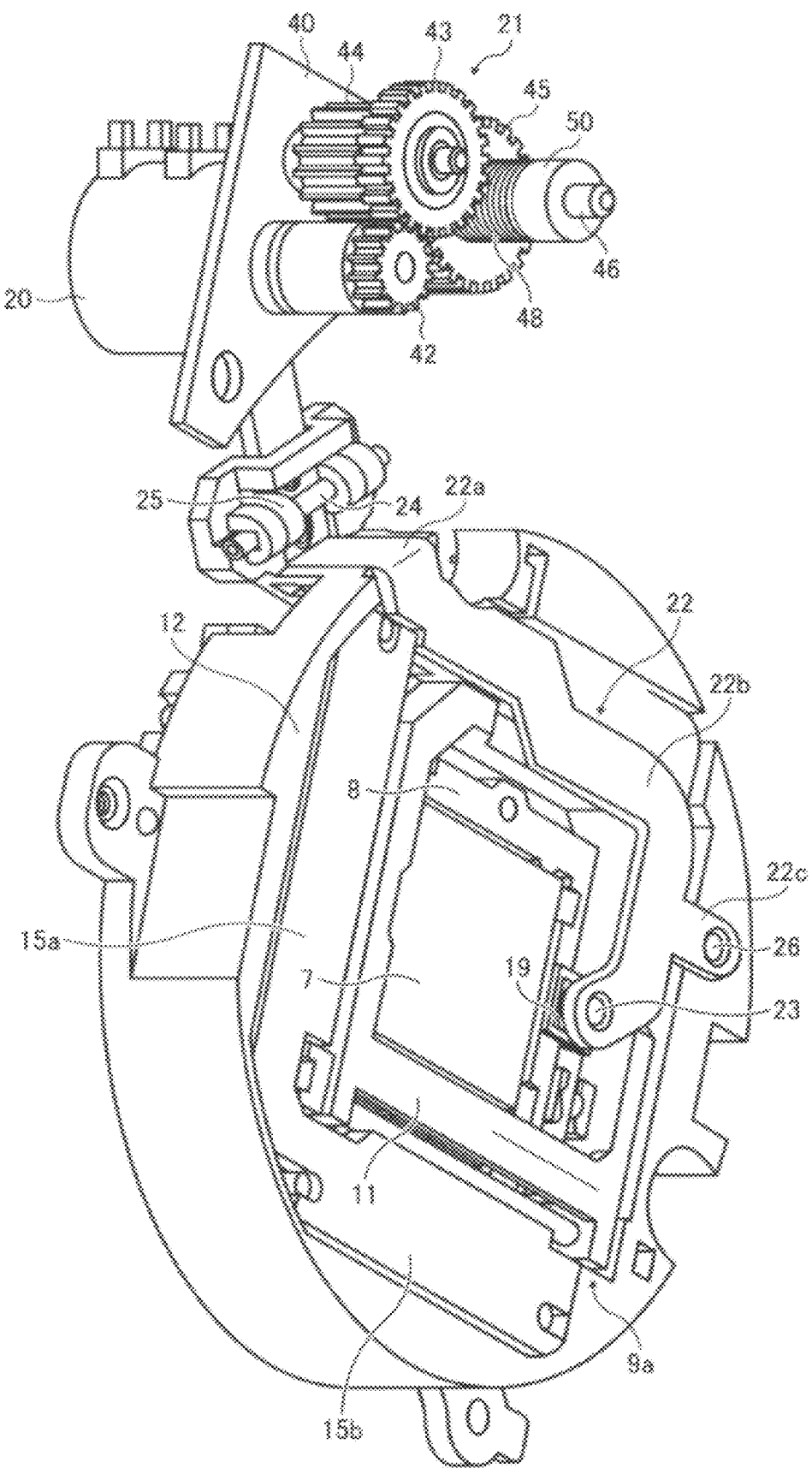
FIG. 7 is a perspective view schematically showing the holding mechanism.
Figure 13B:
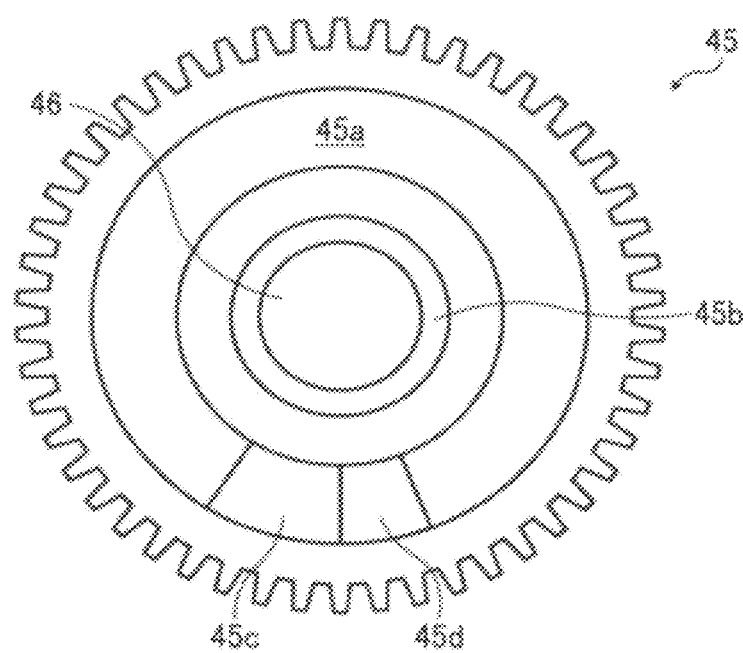
FIG. 13B is a top view explaining a configuration of a cam gear and a cam surface of the cam gear and showing the cam surface viewed from upper side.

The fixation lever 22 is, as shown in FIGS. 7 and 13, an elongated member which extends while being curved when viewed from an upper side (photographing lens system side) and has the fixing pin 23 at an end. The fixing pin 23 is a projection member configured to be engaged with the engagement hole 19 of the image pickup device holding frame 8 and has an end formed in a substantially spherical shape (see FIGS. 10 and 11). The fixing pin is attached and fixed to the end of the fixation lever 22 so as to be projected toward the front surface side of the image pickup device holding frame 8 (a front surface side of the image pickup device 7) (see FIG. 3).

The fixation lever 22 is, as shown in FIG. 11, provided with an oscillating shaft 24 at a vicinity of an intermediate part in the extending direction. The oscillating shaft 24 is loosely supported by a bearing member 25 (see FIGS. 4, 7, and 8) provided on the base plate 6. As described above, the oscillating shaft 24 is loosely supported by the bearing member 25 so that friction of the oscillating shaft 24 occurring when relatively rotating in the bearing member 25 is reduced. Therefore, the fixation lever 22 is held on the base plate 6 via the oscillating shaft 24 and the bearing member 25 so as to be capable of oscillating. The fixation lever 22 has a step portion 22a provided at a position closer to the end than the oscillating shaft 24 and the step portion 22a is inserted into an opening 6a (see FIGS. 4 and 8) provided on the base plate 6. An end-side part of the fixation lever 22, which is closer to the end than the step portion 22a, is disposed along a surface of the slidably-holding frame 12 (see FIGS. 4 and 7). At the opening 6a, the oscillating shaft 24 and the bearing member supporting the oscillating shaft 24 are also provided.

The end-side part of the fixation lever 22 has a curved portion 22b curved along an edge portion of the sliding frame 11 and an end portion extending to a position at a vicinity of the engagement hole 19 of the image pickup device holding frame 8. In the end-side part of the fixation lever 22, an extending portion 22c which laterally extends is formed at a position between a position to which the fixing pin 23 is attached and fixed and the curved portion 22b. A positioning engagement pin 26 as the locking device is provided on the extending portion 22c. The positioning engagement pin 26 is disposed so as to be capable of loosely fitting into a positioning hole 12a, as the locking device, provided on the sliding frame 12. The positioning hole 12a has an inner diameter larger than an outer diameter of the positioning engagement pin 26.

Figure 8:
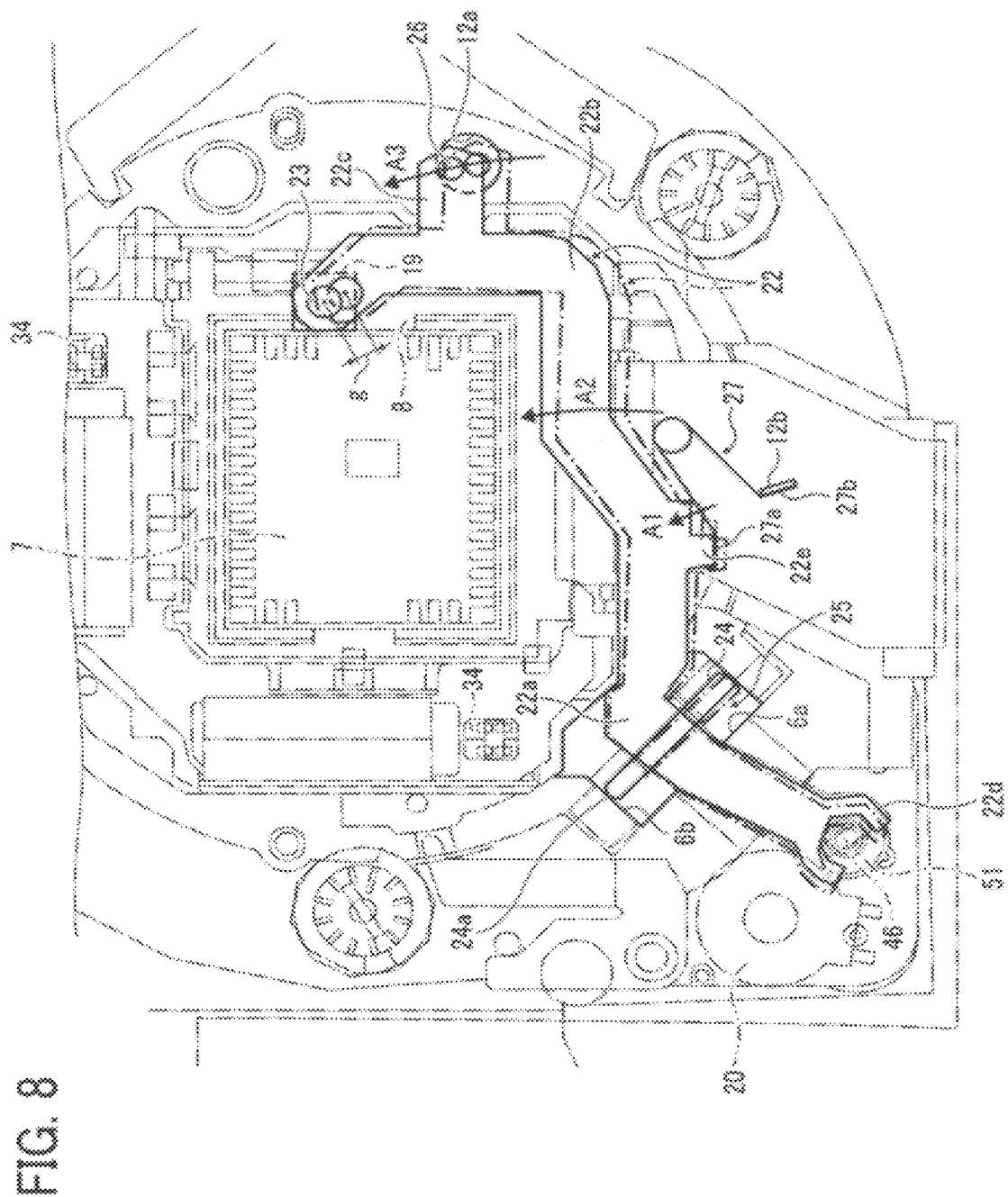
FIG. 8 is an explanatory view showing the base plate of the digital camera viewed from a front side to explain positioned and deviated states in a fixation lever, related members being shown by solid lines and other members being shown by imaginary lines.

A rear side part of the fixation lever 22, which is disposed at a rear side of the fixation lever 22 from the step portion 22a extends, as shown in FIGS. 5 and 8, at a back side of the base plate 6 (back surface side of the image pickup device 7) and a connection portion 22d is formed at a rear end. The connection portion 22d is formed in a circular arc shape (see FIG. 8) having an inner diameter larger than an outer diameter of the operating shaft 46 so as to be capable of surrounding a part of the operating shaft 46 with an interval. The connection portion 22*d* is positioned so as to surround a part of the operating shaft 46 at a position between a lower surface 51*a* of the lever receiving member 51 and an upper surface 52*a* of the spring receiving member 52, which faces to each other, at the other end of the operating shaft 46 (see FIG. 11).

At the end-side part of the fixation lever 22, the fixation lever 22 has an engagement projection portion 22*e* disposed between the step portion 22*a* and the curved portion 22*b* (see FIG. 11) and one end 27*a* of the torsion spring 27 is engaged with the engagement projection portion 22*e*. The other end 27*b* of the torsion spring 27 is engaged with a spring receiving projection portion 12*b* (see FIG. 8) provided on the slidably holding frame 12. The torsion spring 27 is, as shown in FIGS. 8 and 11, configured to bias the fixation lever 22 along the X-Y plane in a direction (see arrow A1) away from the spring receiving projection portion 12*b* engaged with the other end 27*b*. Thereby, as described below, in the fixation lever 22, in a state where the connection portion 22*d* is not sandwiched or pinched by the lower surface 51*a* of the lever receiving member 51 and the upper surface 52*a* of the spring receiving member 52, that is, in a state where the connection portion 22*d* is not fixed, as shown in FIGS. 4 and 8, the one end 24*a* of the oscillating shaft 24 supported by the bearing 25, as a later-described locking device has contact with or abuts on the one end 6*b*, as the locking device, (that is, an end at a side away from the torsion spring 27) of the opening 6*a* on which the bearing member 25 is provided so as to rotate the fixation lever 22 about the contact part along the X-Y plane (see arrows A2, A3). Then, the positioning engagement pin 26 provided on the end-side part of the fixation lever 22 is pressed in the rotating direction (see arrow A3) in the positioning hole 12*a* of the slidably holding frame 12, in which the positioning engagement pin 26 is loosely fitted. As described above, the one end 24*a* of the oscillating shaft 24 has contact with or abuts on the one end 6*b* of the opening 6*a* by the bias of the torsion spring 27 and the positioning engagement pin 26 is pressed in the rotating direction (see arrow A3) in the positioning hole 12*a* of the sliding frame 12 so that the fixation lever 22 is positioned in the X-Y plane. At this time, although the fixation lever 22 is, as described below, in a released state and inclined about the oscillating shaft 24 relative to the X-Y plane (see FIGS. 14 and 15A), the fixation lever 22 is disposed substantially along the X-Y plane and therefore the inclination does not have an importance. Furthermore, since the connection portion 22*d* surrounds a part of the operating shaft 46 with an interval, the fixation lever 22 is not prevented from being positioned. As described above, the fixation lever 22 is configured to be pressed in one direction to be positioned so that the fixation lever 22 is smoothly moved.

In the state where the fixation lever 22 is positioned, a relationship between the opening 6*a* (the one end 6*b*) in which the bearing member 25 is provided and the oscillating shaft 24 (one end 24*a*) and a relationship between the positioning engagement pin 26 and the positioning hole 12*a* of the slidably holding frame 12 are set such that the fixing pin 23 provided on the end of the fixation lever 22 is appropriately engaged with the engagement hole 19 of the image pickup device holding frame 8 (image pickup device 7) set to the original position in the electrically holding. The above appropriately engagement is a state where a center position of the engagement hole 19 is matched with a center position of the fixing pin 23 in the optical axis direction (Z axis direction) in the engagement state (see FIG. 10).

Next, the operation of the holding mechanism 10 controlling and holding the movement of the image pickup device holding frame 8 is explained with reference to FIG. 15. Furthermore, in FIG. 15, in order to facilitate understanding, the inclination of the fixation lever 22 (orientation of the connection portion 22*d* between the lower surface 51*a* of the lever receiving member 51 and the upper surface 52*a* of the spring receiving member 52) is emphatically illustrated, but does not necessarily correspond to the actual movement of the holding mechanism 10. Furthermore, in the explanation of the movement of the holding mechanism 10, upward and downward directions in front vision of FIG. 15 are used.

Figure 14:
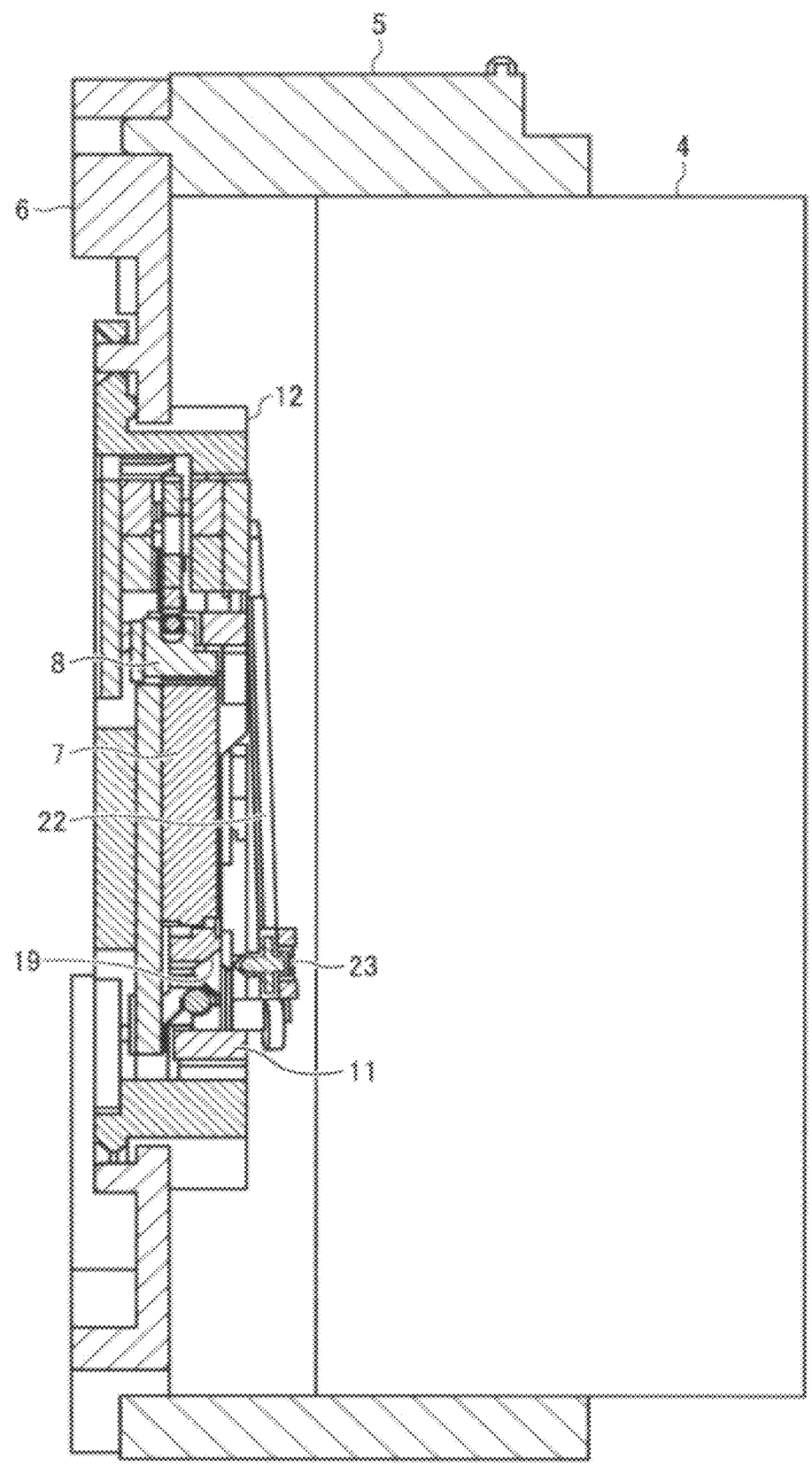
FIG. 14 is a sectional view similar to FIG. 3 showing a state where the lens barrel of the digital camera extends from the lens barrel housing cylinder.

In a case where a not-illustrated electrical power switch of the digital camera 1 (see FIG. 1) is turned on, as shown in FIG. 14, a not-illustrated driving mechanism moves the lens barrel 4 from a collapsed position (a position shown in FIG. 4) in the lens barrel housing cylinder 5 to the photographing standby position at a front side (right side of FIG. 14) to set the digital camera to be in the photographable state. Thereby, a predetermined space is obtained between a bottom surface side of the lens barrel 4 and an object side of the image pickup device holding frame 8 (a side of image pickup device 7) in the optical axis direction in the lens barrel housing cylinder 5.

When a not-illustrated image blur correction switch is turned on, the driving motor 20 is driven to be rotated in a direction (in a reverse direction, hereinafter), the rotation transmitting gear 43 engaged with the output gear 42 and the transmitting gear 44 are rotated in a direction (in a normal direction, hereinafter), so that the cam gear 45 engaged with the transmitting gear 44 is rotated in the reverse direction and an end portion of the cam follower 47 is in a state of slidably abutting on the lower portion 45*c* (see FIG. 13) of the cam surface 45*a* (see FIG. 15A).

Figure 15A:
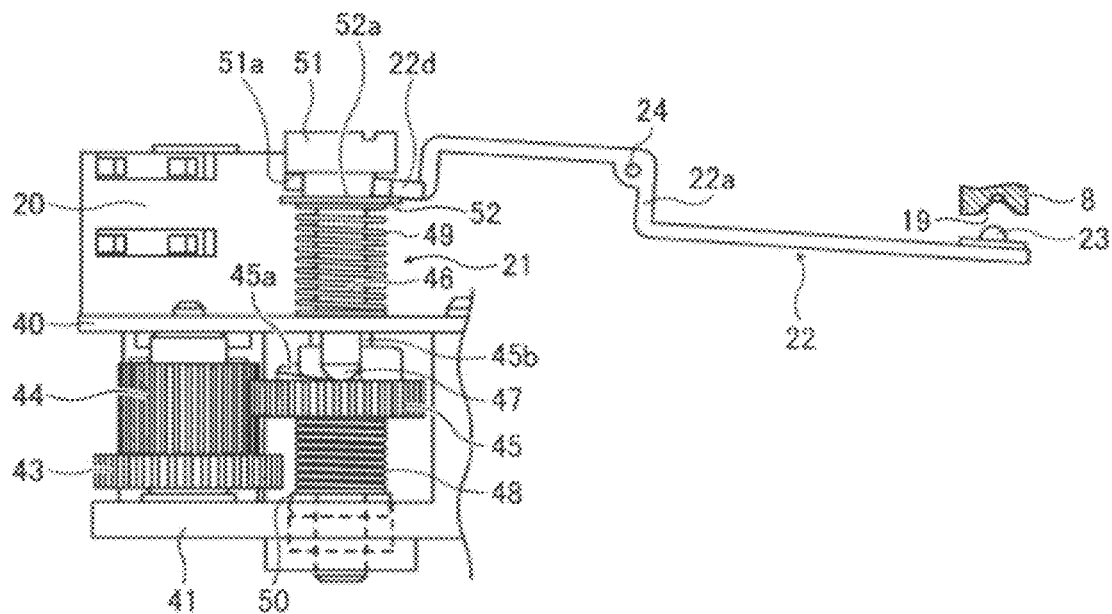
FIG. 15A is an explanatory view explaining an operation of the holding mechanism and showing a released state of the holding mechanism.

At this time, as shown in FIG. 15A, by biasing forces of the first coil spring 48 and the second coil spring 49, the cam gear 45 is upwardly moved to be in a state where the cam gear 45 is most close to the motor holding plate 40 so that the operating shaft 46 is positioned at a most upper side. Then, the connection portion 22*d* of the fixation lever 22 is positioned at a most upper side between the lower surface 51*a* of the lever receiving member 51 and the upper surface 52*a* of the spring receiving member 52. The fixation lever 22 is rotated about the oscillating shaft 24 supported by the bearing member 25 (see FIG. 4) when the connection portion 22*d* is positioned at the most upper side position, so that the end portion of the fixation lever is positioned at a most lower side position. Therefore, the fixing pin 23 provided on the end portion of the fixation lever 22 is in a disengaged state where the fixing pin 23 is disengaged with or separated from the engagement hole 19 of the image pickup device holding frame 8 (image pickup device 7) disposed at the original position in the electrically holding (see FIG. 14). At this time, movement of the image pickup device holding frame 8 (image pickup device 7) is not controlled by the holding mechanism 10 (fixation lever 22) and therefore the image blur correction mechanism 9 is in an operable state and hereinafter, it is referred to as a released state. In the released state, as described above, the fixation lever 22 is positioned at a position where the fixing pin 23 of the end portion of the fixation lever 22 is appropriately engaged with the engagement hole 19 of the image pickup device holding frame 8 (image pickup device 7) positioned at the original position in the electrically holding by the bias of the torsion spring 27.

Here, when the not-illustrated image blur correction switch for operating the image blur mechanism 9 is turned off (same in a case where the not-illustrated electrical power switch of the digital camera 1 (see FIG. 1) is turned off), as shown in FIG. 3, the lens barrel is set to the collapsed position in the lens barrel housing cylinder 5. Then, in the holding mechanism 10, the driving motor 20 is driven to be rotated in the normal direction and the rotation transmitting gear 43 engaged with the output gear 42 and the transmitting gear 44 are rotated in the reverse direction so that the cam gear 45 engaged with the transmitting gear 44 is rotated in the normal direction and then the end portion of the cam follower 47 climbs the inclined surface from the lower portion 45c in the cam surface 45a and reaches the upper portion 45d (see FIGS. 13 and 15C)

Figure 15B:
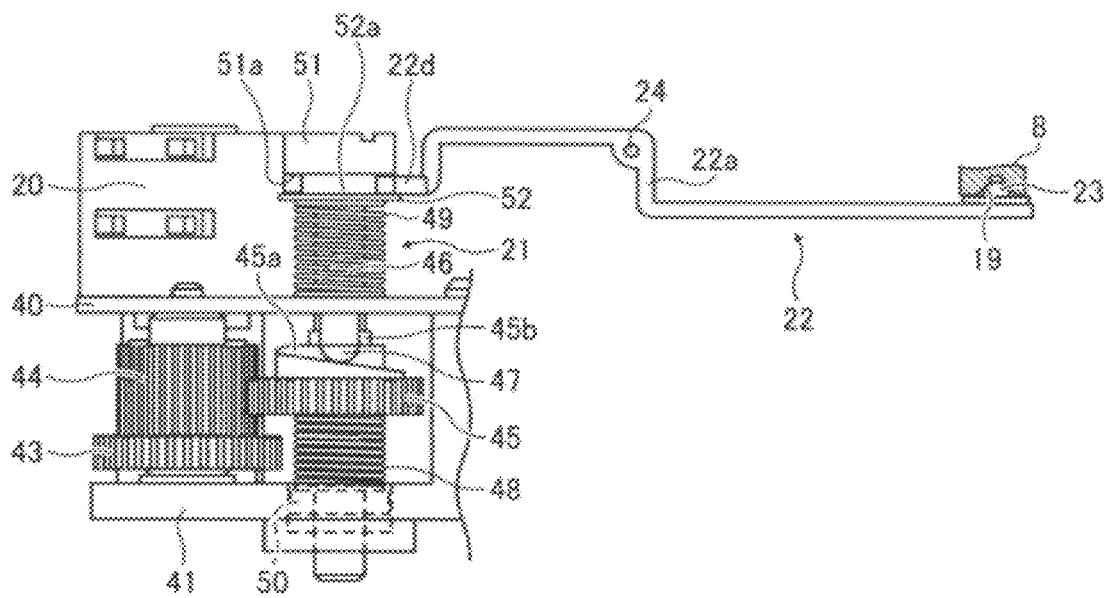
FIG. 15B is an explanatory view explaining an operation of the holding mechanism and showing a transitional state between the released state and a holding state of the holding mechanism.

In this process, when the end portion of the cam follower 47 slidably abuts on an intermediate part between the lower portion 45c and the upper portion 45d in the cam surface 45a (see FIG. 13), as shown in FIG. 15B, due to an action of the cam follower 47 and the cam surface 45a, the cam gear 45 is pressed down to press down the spring stop member 50 attached and fixed to the one end of the operating shaft 46 via the first coil spring 48 and to press down the operating shaft 46. Thereby, the lever receiving member 51 attached and fixed to the other end (the upper end of FIG. 15) of the operating shaft 46 is pressed down and the connection portion 22d of the fixation lever 22 positioned at a lower side of the lower surface 51a presses down the spring receiving member 52 positioned at a lower side thereof while acting against the biasing force of the second coil spring 49. This is because the biasing force of the first coil spring 48 is set to be larger than that of the second coil spring 49. By pressing down the connection portion 22d, the fixation lever 22 is rotated about the oscillating shaft 24, the end portion is moved upwardly and the fixing pin 23 provided on the end portion is moved close to the engagement hole 19 of the image pickup device holding frame 8 (image pickup device 7) positioned at the original position in the electrically holding.

In a process in which the end portion of the cam follower 47 climbs the inclined surface from the lower portion 45c while slidably abutting on the cam surface 45a, by pressing down the cam gear 45, that is, the operating shaft 46, the connection portion 22d is pressed down to a predetermined position, so that the fixing pin 23 of the fixation lever 22 is engaged with the engagement hole 19 of the image pickup device holding frame 8 (image pickup device 7) positioned at the original position in the electrically holding. Thereby, the connection portion 22d of the fixation lever 22 is controlled to be moved toward a lower side so that the movement of the operating shaft 46 in a direction toward the lower side is controlled via the lever receiving member 51 abutting on the upper surface. Hereinafter, this position is referred to as a most lower position in the operating shaft 46. In this state, it is set that the end portion of the cam follower 47 does not reach the upper portion 45d of the cam surface 45a.

Therefore, when the end portion of the cam follower 47 further climbs the cam surface 45a so that the cam gear 45 is pressed down, the first coil spring 48 which is stopped or supported by the spring stop member 50 at a lower end is compressed or shrunk so that the biasing force given onto the spring stop member 50 of the one end of the operating shaft 46 (lower end of FIG. 15) toward the lower side is gradually increased and the biasing force given onto the connection portion 22d of the fixation lever 22 toward the lower side by the operating shaft 46, that is, the lever receiving member 51 at the other end is gradually increased. Thereby, a pressing force of the fixing pin 23 of the fixation lever 22 toward the engagement hole 19 of the image pickup device holding frame 8 (image pickup device 7) positioned at the original position in the electrically holding is gradually increased and also a friction force affecting between the lower surface 51a of the lever receiving member 51 and the connection portion 22d (upper surface thereof) of the fixation lever 22 is gradually increased.

Figure 15C:
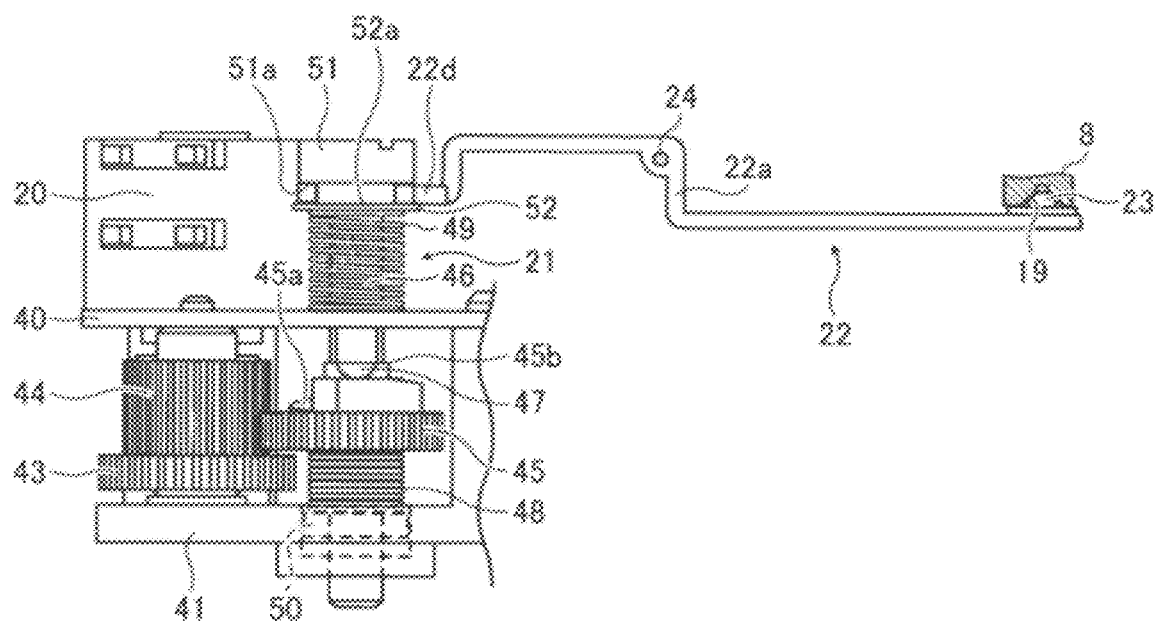
FIG. 15C is an explanatory view explaining an operation of the holding mechanism and showing the holding state of the holding mechanism.

After that, when the end portion of the cam follower 47 reaches the upper portion 45d of the cam surface 45a, as shown in FIG. 15C, the cam gear 45 is moved toward the lower side and is in a state most close to the flange 41 so that the biasing force given onto the spring stop member 50, that is, the operating shaft 46 positioned at the most lower position toward the lower side by the first coil spring 48 becomes maximum and the biasing force given onto the connection portion 22d of the fixation lever 22 toward the lower side by the lever receiving member 51 at the other end thereof becomes maximum.

Therefore, the fixing pin 23 provided on the end of the fixation lever 22 is in an engaged state where the fixing pin 23 is engaged with the engagement hole 19 of the image pickup device holding frame 8 (image pickup device 7) positioned at the original position in the electrically holding by the maximum pressing force (see FIG. 3). The movement of the image pickup device holding frame 8 is controlled by the holding mechanism 10 (that is, the fixation lever 22) in a state where the center of the image pickup device 7 is positioned on the optical axis. Hereinafter, this state is referred to as a holding state, and setting the image pickup device holding frame 8 (image pickup device 7) to be in the holding state by the holding mechanism 10 is referred to as mechanically holding. In this holding state, the fixation lever 22 is fixed in a positioned state as described above by the friction force acting between the connection portion 22d (upper surface thereof) and the lower surface 51a of the lever receiving member 51 and the biasing force from the torsion spring 27. In other words, in the holding state, the fixation lever 22 is fixed in a positioned state by a fixing force which is a resultant force combining the above friction force and the above biasing force. Here, the friction force acting between the connection portion 22d (upper surface thereof) of the fixation lever 22 and the lower surface 51a of the lever receiving member 51 is given by the biasing force mainly from the first coil spring 48, but influences of the biasing force from the second coil spring 49, a reaction force from the fixation lever 22 in which the fixing pin 23 is pressed onto the engagement hole 19 of the image pickup device holding frame 8 (image pickup device 7), and the like are also given. The friction force acting between the connection portion 22d (upper surface thereof) of the fixation lever 22 and the lower surface 51a of the lever receiving member 51 is set to be larger than the biasing force from the torsion spring 27.

If, even when the not-illustrated electrical power switch of the digital camera 1 is in a state of being turned on, the not-illustrated image blur correction switch is turned off, as well as when the electrical power switch is turned off (see FIG. 15), the fixing pin 23 is in the engaged state where the fixing pin 23 is engaged with the engagement hole 19 formed on the image pickup device holding frame 8 and the image pickup device holding frame 8 is mechanically held. At this time, on the displaying device 32m the image obtained under control of the controller 31 is displayed. Hereinafter, this is referred to as a monitoring state.

As described above, in the holding mechanism 10 (digital camera 1) of Example 1, the fixation lever 22 functions as the holding member which is engaged with the image blur correction mechanism 9 (engagement hole 19 of the image pickup device holding frame 8) so as to mechanically control the movement of the image pickup device 7. Moreover, in the holding mechanism 10 (digital camera 1), the torsion spring 27 functions as the elastic member which biases the fixation lever 22 as the holding member so as to position in the released state of the holding mechanism 10, the held position of the image pickup device 7 in the holding state of the holding mechanism 10 to the original position in the electrically holding. Furthermore, in the holding mechanism 10 (digital camera 1) of Example 1, the one end 6b of the opening 6a and the one end 24a of the oscillating shaft 24 as well as the positioning engagement pin 26 and the positioning hole 12a of the slidably holding frame 12 function as the locking device configured to lock the fixation lever 22 as the holding member against the torsion spring 27 as the elastic member at a positioning position, that is, a position adapted to the original position in the electrically holding. In the holding mechanism 10 (digital camera 1) of Example 1, the driving motor 20 and the reciprocating mechanism 21 function as the holding member moving device configured to move the fixation lever 22 as the holding member (to oscillate the fixation lever 23 about the oscillating shaft 24 in Example 1) so as to engage the fixing pin 23 with the engagement hole 19 in the holding state of the holding mechanism 10 and separate the fixing pin 23 from the engagement hole 19 in the released state of the holding mechanism 10.

(Technical Problem)

Next, the technical problem of the digital camera 1 will be explained with reference to FIGS. 16 and 17. In order to facilitate understanding, positional deviation of the image pickup device 7 and image blur is emphatically shown but those are not necessarily matched with actual movement states.

In the digital camera 1, as described above, when the image blur correction switch is turned off, the image pickup device holding frame 8 (image pickup device 7) is mechanically held by the holding mechanism 10 and when the image blur correction switch is turned on, the holding mechanism 10 is set to be in the released state and the image blur correction is started by the image blur correction mechanism 9. Here, as described above, in the image blur correction mechanism 9, in the electrically holding state, the image pickup device holding frame 8 (image pickup device 7) is moved on the X-Y plane on a basis of the original position on the optical axis as a reference position so as to cancel or eliminate a camera shake, that is, an image blur to appropriately perform the image blur correction. In the image blur correction mechanism 9, the electrically holding is started, that is, application of electrical current to each coil 16a, 16b is started, to start the image blur correction so that the image pickup device holding frame 8 (image pickup device 7) is positioned to the original position stored in the memory device 31a. Therefore, in the digital camera 1, when the image blur correction switch is turned on, the image pickup device holding frame 8 (image pickup device 7) is changed from the mechanically holding state by the holding mechanism 10 to the electrically holding state by the image blur correction mechanism 9. Here, as described above, in the mechanically holding by the holding mechanism 10, since the image pickup device holding frame 8 (image pickup device 7) is positioned to the original position in the electrically holding, even when the holding state is changed from the mechanically holding to the electrically holding, the image pickup device holding frame 8 (image pickup device 7) is not moved (see FIG. 16A). Therefore, in a case where the image blur correction is started for photographing from the monitoring state, the image displayed on the displaying device 32 provided at a back side of the camera body 2 of the digital camera 1 is not changed at all even when the holding state is changed from the mechanically holding to the electrically holding (see FIG. 17A).

However, when the image pickup device holding frame 8 is affected by unexpected impact or shock in the mechanically holding state by the holding mechanism 10, it is possible that the position of the image pickup device holding frame 8 (image pickup device 7) is deviated from the original position in the electrically holding. Hereinafter, it will be explained.

In the mechanically holding state by the holding mechanism 10, as described above, the fixation lever 22 is fixed in the positioned state where the fixation lever 22 is positioned by the friction force acting between the connection portion 22d (upper surface thereof) of the fixation lever 22 and the lower surface 51a of the lever receiving member 51 and the biasing force from the torsion spring 27 (see FIGS. 4 and 8). At this time, in the fixation lever 22, since the one end 6b of the opening 6a has contact with or abuts on the one end 24a of the oscillating shaft 24 and the positioning engagement pin 26 is pressed in the rotational direction (see arrow A3) in the positioning hole 12a of the slidably holding frame 12, the movement of the fixation lever 22 in the rotational direction along the X-Y plane is physically controlled or limited. However, since the positioning hole 12a of the slidably holding frame 12 is a hole in which the positioning engagement pin 26 is loosely fitted, and the bearing member 25 is configured to loosely support the oscillating shaft 24, the movement of the fixation lever 22 is not controlled or limited in a reverse direction (hereinafter, referred to as unlocking direction) to the rotational direction along the X-Y plane by the positioning engagement pin 26 and the oscillating shaft 24.

Therefore, in the holding mechanism 10, the friction force affecting between the connection portion 22d (upper surface thereof) of the fixation lever 22 and the lower surface 51a of the lever receiving member 51 and the biasing force from the torsion spring 27, that is, the fixing force which is the combining the friction force and the biasing force, are set so as to withstand expected impact or shock in the unlocking direction, affecting the image pickup device holding frame 8. The impact or shock is, for example, due to inertia occurring in the image pickup device holding frame 8 holding the image pickup device 7 when rapidly moving the digital camera 1.

However, when the image pickup device holding frame 8 is affected by the unexpected impact or shock in the unlocking direction, the image pickup device holding frame 8 is moved in the unlocking direction against the above friction force and the above biasing force, so that the fixation lever 22 is rotated via the fixing pin 23 engaged with the engagement hole 19 of the image pickup device holding frame 8 (see the fixation lever 22 shown by a dashed line in FIG. 8). That is, the image pickup device holding frame 8 is affected by the impact or shock in the unlocking direction, which is larger than the fixing force of the friction force and the biasing force, so that the fixation lever 22 is rotated while maintaining the engagement state between the engagement hole 19 and the fixing pin 23. Therefore, the contact state of the connection portion 22d of the fixation lever 22 with the lower surface 51a of the lever receiving member 51 is deviated (see the fixation lever 22 shown by a dashed line in FIG. 8) from the positioned state (see the fixation lever 22 shown by a solid line in FIG. 8). Here, since the holding state in the holding mechanism 10 is maintained, the lower surface 51a of the lever receiving member 51 and the connection portion 22d of the fixation lever 22 are fixed with the contact state in a state of the fixation lever 22 when the impact is smaller than the set combined force, that is, the above deviated state of the fixation lever 22 (see the fixation lever 22 shown by the dashed line in FIG. 8). This is because the friction force affecting between the connection portion 22d (upper surface thereof) of the fixation lever 22 and the lower surface 51a of the lever receiving member 51 is set to be larger than the biasing force from the torsion spring 27. Therefore, the position of the image pickup device holding frame 8 (the image pickup device 7) (see the image pickup device 7 shown by a solid line in FIG. 16B) is deviated (see arrow A4 in FIG. 16B) from the original position in the electrically holding (see the image pickup device shown by a dashed-two-dotted line in FIG. 16B).

Figure 16A:
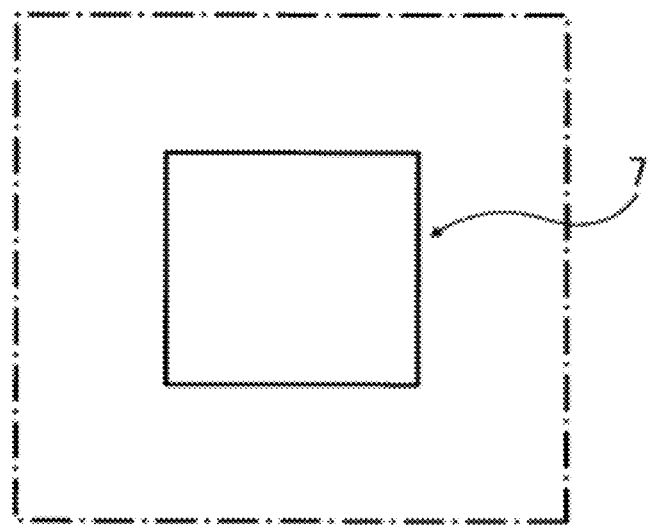
FIG. 16A is an explanatory view showing the image pickup device within a movable range shown by a dashed line to explain a positional deviation of the image pickup device in the holding state of the holding mechanism and showing a state where deviation does not occur.
Figure 16B:
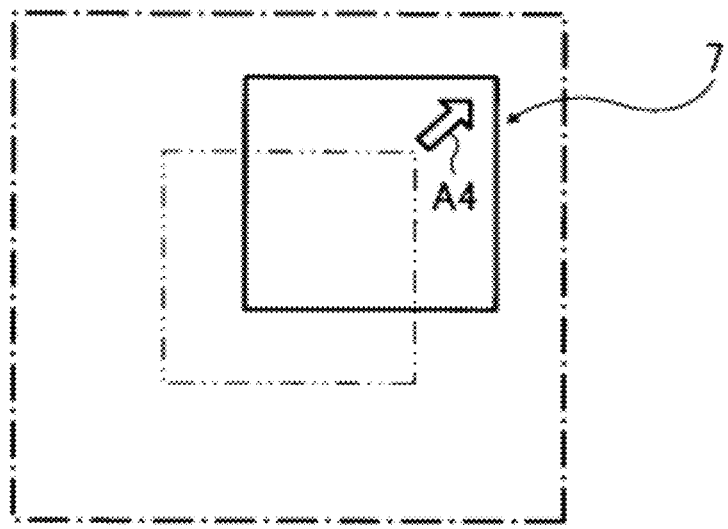
FIG. 16B is an explanatory view showing the image pickup device within a movable range shown by a dashed line to explain a positional deviation of the image pickup device in the holding state of the holding mechanism and showing a state where deviation occurs.
Figure 17A:
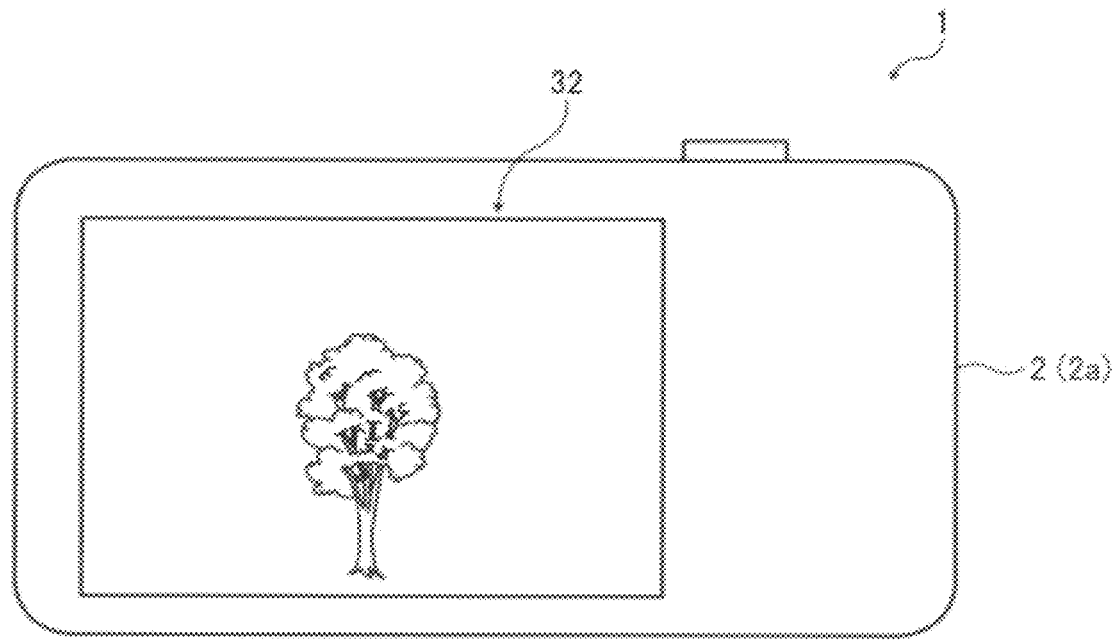
FIG. 17A is an explanatory view explaining an image blur occurring on a displaying device when a holding state is changed from a mechanically holding to an electrically holding and showing a state where the image blur does not occur.
Figure 17B:
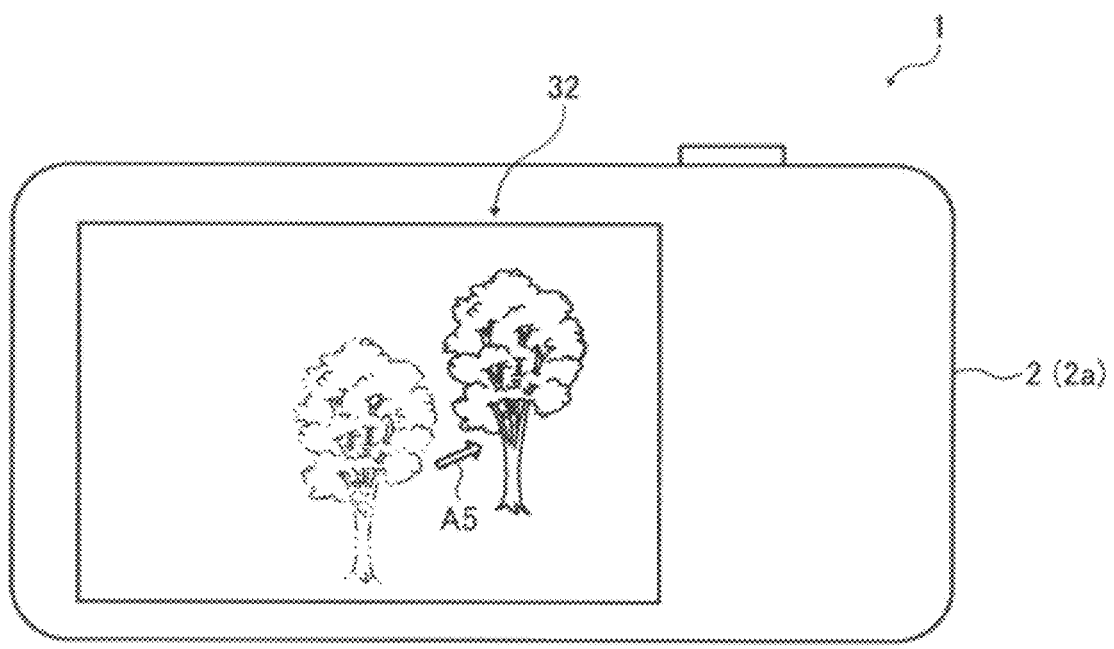
FIG. 17B is an explanatory view explaining an image blur occurring on the displaying device when the holding state is changed from the mechanically holding to the electrically holding and showing a state where the image blur occurs.

Then, in the digital camera 1, when the image blur correction switch is turned on and the holding state is changed from the mechanically holding state to the electrically holding state, the image pickup device holding frame 8 (image pickup device 7) is moved from the deviated position in the mechanically holding to the original position in the electrically holding (in reverse direction to the direction shown by arrow 4 in FIG. 16B). Therefore, in the digital camera 1, as shown in FIG. 17B, even if the subject image is adjusted to be in an appropriate state in the monitoring state (see the subject image shown by a dashed-two-dotted line), when the image blur correction switch is turned on for photographing, a so-called image blur (see arrow A5), that is, movement of the subject image from the adjusted state (see the subject image shown by the dashed-two-dotted line) to the deviated state (see the subject image shown by the solid line) as the holding state is changed from the mechanically holding state to the electrically holding state, occurs for an instant on the displaying device 32 provided at the back surface side of the camera body 2, so that a user has a sense of discomfort. Accordingly, it is preferable to reduce or eliminate the sense of discomfort of the user by measure to be taken for improvement.

(Deviation Eliminating Operation)

Figure 18:
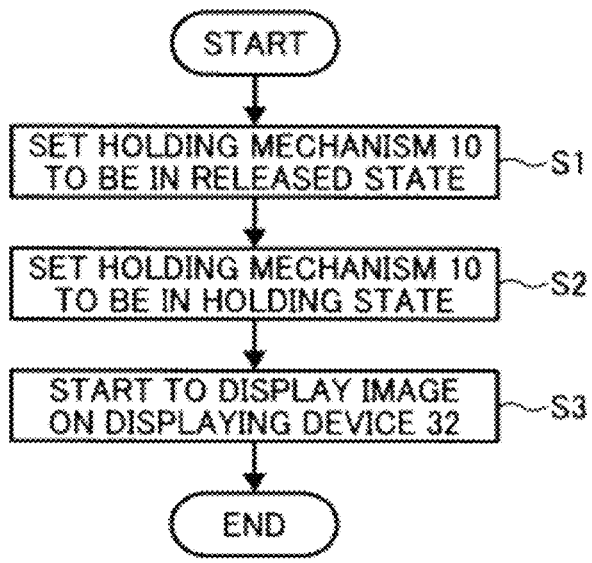
FIG. 18 is a flowchart showing an example of control process of a deviation eliminating operation in the holding mechanism (controller controlling operations thereof).

Next, a deviation eliminating operation performed by the digital camera 1 of Example 1 will be explained. FIG. 18 is a flowchart showing an example of control processing of the deviation eliminating operation in the holding mechanism 10 (controller 31 for controlling the operation). Hereinafter, each step in the flowchart in FIG. 18 as an example of the control processing in the holding mechanism 10 when performing the deviation eliminating operation in the controller 31 will be explained. Steps in this flowchart is started when the electrical power switch of the digital camera 1 is turned on.

In step S1, the holding mechanism 10 is set to be in the released state and the process proceeds to step S2. In step S1, the electrical power switch is in a state of being turned on to set the digital camera 1 to be in a photographable state so that the holding state of the holding mechanism 10 is changed from the holding state (see FIG. 15C) to the released state (see FIG. 15A). That is, the driving motor 20 is driven to be rotated by predetermined pulses in the normal direction. The predetermined pulses are according to a rotational angle required to allow the end portion of the cam follower 47 to climb the cam surface 45a from the lower portion 45c to the upper portion 45d as the cam gear 45 is rotated in the normal direction. Thereby, the cam gear 45 is pressed up to the maximum position by the biasing forces of the first coil spring 48 and the second coil spring 49 so that the holding mechanism 10 is in the released state (see FIG. 15A) where the fixing pin 23 of the fixation lever 22 is disengaged with the engagement hole 19 of the image pickup device holding frame 8. Then, in the fixation lever 22, the friction does not almost affect between the lower surface 51a of the lever receiving member 51 and the connection portion 22d (upper surface thereof) so that the biasing force of the torsion spring 27 mainly affects the fixation lever 22. Therefore, the fixation lever 22 is positioned in the X-Y plane (see the fixation lever 22 shown by the solid line in FIG. 8) by the bias of the torsion spring 27 to allow the one end 6b of the opening 6a to abuts on the one end 24a of the oscillating shaft 24 and to press down the positioning engagement pin 26 in the rotational direction (see arrow A3 in FIG. 8) in the positioning hole 12a of the slidably holding frame 12. In this state, as describe above, the fixing pin 23 of the end of the fixation lever 22 is in a position where the fixing pin 23 is appropriately engaged with the engagement hole 19 of the image pickup device holding frame 8 (image pickup device 7) positioned at the original position in the electrically holding by setting of the positional relationship between the opening 6a (one end 6b thereof) in which the bearing member 25 is provided and the oscillating shaft 24 (one end 24a thereof) and the positional relationship between the positioning engagement pin 26 and the positioning hole 12a of the slidably holding frame 12.

In step S2, next to setting the holding mechanism 10 to be in the released state in step S1, the holding mechanism 10 is set to be in the holding state and the process proceeds to step S3. In step S2, the holding mechanism 10 which is set to be in the released state (see FIG. 15C) is set to be in the holding state. That is, the driving motor 20 is driven to be rotated by predetermined pulses in the reverse direction. Thereby, the cam gear 45 is pressed down so that the fixing pin 23 of the fixation lever 22 is close to the engagement hole 19 of the image pickup device holding frame 8. At this time, even when an opening end at the front surface side of the engagement hole 19 is positioned at any position within a movable range of the image pickup device holding frame 8, the fixing pin 23 of the fixation lever 22 positioned in the X-Y plane by the bias of the torsion spring 27 is set to have a large dimension enough to abut on the above described inclined surface. Accordingly, the fixing pin 23 of the fixation lever 22 positioned in step S1 necessarily abuts in or has contact with the engagement hole 19. Then, the cam gear 45 is further pressed down so that, by a guiding operation of the fixing pin 23 and the engagement hole 19, the image pickup device holding frame 8 is moved to the original position in the electrically holding (in a direction reverse to arrow A4 in FIG. 16B) and the fixation lever 22 is in the holding state where the fixing pin 23 of the fixation lever 22 is engaged with the engagement hole 19 of the image pickup device holding frame 8 with the maximum pressing force (see FIG. 15C). Therefore, step S1 and step S2 are substantial deviation eliminating operations.

In step S3, next to setting the holding mechanism 10 to be in the holding state in step S2, an image is started to be displayed on the displaying device 32 and the steps in this flowchart are terminated. In step S3, displaying the image on the displaying device 32 is started to set the digital camera 1 to be in the photographable state.

In the digital camera 1 of Example 1, when the electrical power switch is turned on, that is, actuated, the deviation eliminating operation (flowchart in FIG. 18) is performed. Accordingly, even if the image pickup device holding frame 8 is affected by an unexpected large impact or shock before the digital camera is actuated, a position of the image pickup device holding frame 8, that is, the image pickup device 7 can be changed from the position in the mechanically holding by the holding mechanism 10 to the original position in the electrically holding. Therefore, when the image blur correction switch is turned on and the holding state is changed from the mechanically holding state to the electrically holding state, image blur does not occur in the image displayed on the displaying device 32 and therefore the user is steadily prevented from having a sense of discomfort.

Moreover, in the digital camera 1 of Example 1, since displaying the image on the displaying device 32 is started after the substantial deviation eliminating operation (steps S1 to S2) is performed (step S3), the user is steadily prevented from recognizing the image blur with the deviation eliminating operation.

Furthermore, in the digital camera 1 of Example 1, when the image blur correction is started by the image blur correction mechanism 9, the image pickup device holding frame 8 (image pickup device 7) is necessarily positioned at the original position in the electrically holding, that is, the center of the image pickup device 7 held by the image pickup device holding frame 8 is positioned on the optical axis so that the image blur or the camera shake can be appropriately corrected and the image can be prevented from degrading.

In the digital camera 1 of Example 1, if the electrical power switch of the digital camera 1 is turned on and the image blur correction switch is turned off, the fixing pin 23 provided on the one end of the fixation lever 22 is engaged with the engagement hole 19 formed on the image pickup device holding frame 8 to set to be in the electrically holding by the image pickup device holding frame 8. Accordingly, application of electrical current to each coil 16a, 16b, and the like can be turned off. Thereby, power consumption can be reduced.

In the digital camera 1 of Example 1, when the lens barrel 4 extends toward the subject side and a space is formed between the lens barrel 4 and the image pickup device holding frame 8, the one end of the fixation lever 22 is oscillated substantially in the optical axis direction by the operation of the reciprocating mechanism 21. Accordingly, a space at an opposite to the object side in the optical axis direction from the image pickup device 7, where the fixation lever 22 (corresponding to a forcibly pressing plate) is moved, is not required. Thereby, thickness of the lens barrel 4 in the optical axis direction can be reduced.

In the digital camera 1 of Example 1, when the lens barrel 4 extends toward the subject side and a space is formed between the lens barrel 4 and the image pickup device holding frame 8, the one end of the fixation lever 22 is oscillated substantially in the optical axis direction by the operation of the reciprocating mechanism 21. Accordingly, in the digital camera having high density packaging by reducing size, thickness, and the like, the fixation lever 22 capable of oscillating can be mounted without interfering with peripheral parts, wires and the like.

Accordingly, in the digital camera 1 of Example 1, the image blur can be prevented from occurring while reducing the power consumption without degrading the image.

In addition, in the above Example 1, in the deviation eliminating operation (steps in FIG. 18) by the holding mechanism 10 (controller 31 controlling the operation thereof), displaying the image on the displaying device 32 is started (step S3) after the substantial deviation eliminating operation (steps S1 to S2) is performed. However, displaying the image on the displaying device 32 may be started before the substantial deviation eliminating operation is performed. Due to the above configuration, displaying the image on the displaying device 32 can be quickly started. Here, in the imaging apparatus, just after the imaging apparatus is actuated, it is not often the case that composition is determined, but it is often the case that the digital camera 1 itself is moved so that there is less possibility in that the user recognizes the image blur as the deviation elimination operation is performed and the user has a sense of discomfort.

Figure 19:
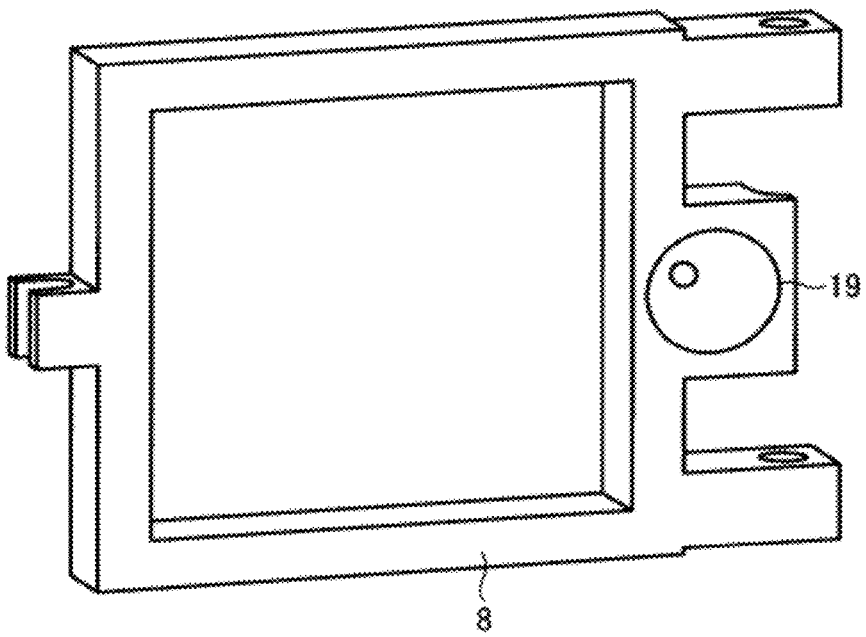
FIG. 19 is a perspective view similarly to FIG. 9 showing another example of the image pickup device holding frame of the digital camera.

In Example 1, the engagement hole 19 of the image pickup device holding frame 8 has the rectangular opening end (see FIG. 9), but it is necessary only that the engagement hole 18 has an inclined surface so as to have a sectional dimension gradually reduced toward the bottom portion and that the opening end at the front surface side is set such that the fixing pin 23 of the fixation lever 22 positioned in the X-Y plane by the bias from the torsion spring 27 can abut on the inclined surface at any position within the movable range of the image pickup device holding frame 8. Accordingly, for example, as shown in FIG. 19, the opening end at the front surface side may have a circular shape and not limited to the configuration of Example 1.

Example 2

Figure 20:
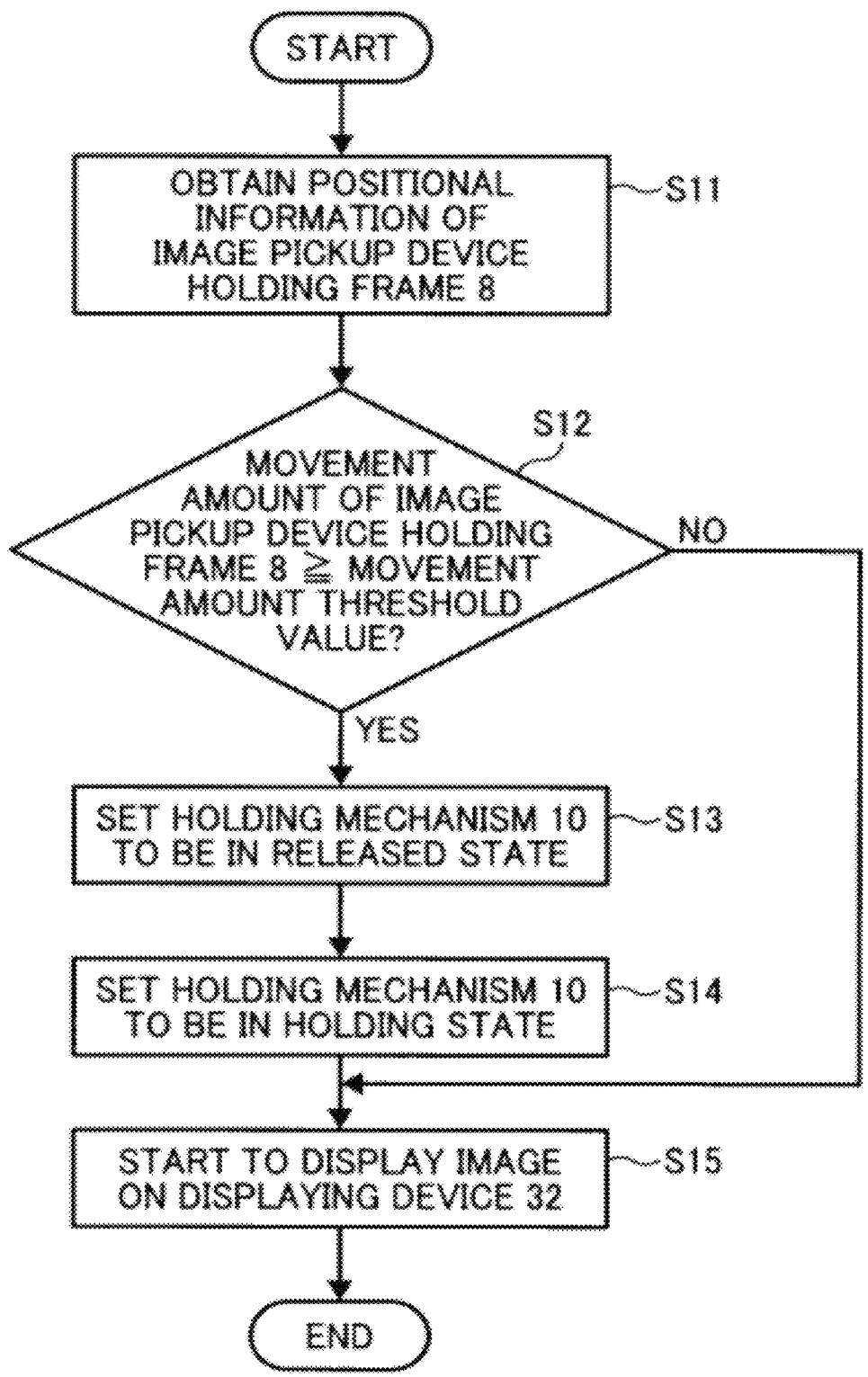
FIG. 20 is a flowchart showing an example of the control process of the deviation eliminating operation in the holding mechanism (controller controlling operations thereof) in the digital camera according to an embodiment of the present invention.

Next, the digital camera 1 (imaging apparatus) according to Example 2 of the present invention will be explained. Example 2 is an example having a different deviation eliminating operation by the holding mechanism 10 (controller 31 controlling the operation thereof). Since the digital camera 1 of Example 2 has a basic configuration similar to the above-described digital camera 1 of Example 1, the same reference numerals are used for the same configuration and detailed explanation will be omitted. FIG. 20 is a flowchart showing an example of the control process of the deviation eliminating operation in the holding mechanism 10 (controller 31 controlling the operation) in the digital camera of Example 2. Hereinafter, each step in the flowchart of FIG. 20 as an example of the control process in the holding mechanism 10 when the deviation eliminating operation is performed will be explained. Steps in this flowchart are started when the electrical power switch of the digital camera 1 is turned on.

In step S11, positional information of the image pickup device holding frame 8 is obtained and the process proceeds to step S12. In step S11, the positional information of the image pickup device holding frame 8 in the X-Y plane is obtained from the position detection device 34 (see FIG. 2) for detecting positions of the image pickup device holding frame 8 and the sliding frame 11.

In step 12, next to obtaining the positional information of the image pickup device holding frame 8 in step S11, it is judged whether or not the movement amount of the image pickup device holding frame 8 from the original position in the electrically holding is a movement threshold value or more and if "Yes", the process proceeds to step S13, and if "No", the process proceeds to step S15. In step S12, it is judged how much deviated amount (movement amount, see "g" in FIG. 8) between the current position of the image pickup device holding frame 8 and the original position in the electrically holding, and if the deviated amount is the movement threshold value or more, it is judged that it is necessary to perform the deviation eliminating operation and the process proceeds to step S13. Moreover, if the deviated amount is less than the movement threshold value, it is judged that it is not necessary to perform the deviation eliminating operation, and the process proceeds to step S15 so as to immediately start displaying the image on the displaying device 32. The movement threshold value is set to a movement amount of the image pickup device holding frame 8 such that the user does not have a sense of discomfort even if the image blur occurs in the image displayed on the displaying device 32 when the holding state is changed from the mechanically holding state to the electrically holding state. It is preferably that the movement threshold value is set to the movement amount of the image pickup device holding frame 8 such that the user does not recognize the image blur occurring in the image displayed on the displaying device 32 when the holding state is changed from the mechanically holding state to the electrically holding state.

In step S13, next to judging that the movement amount in step S12 is the movement threshold value or more, the holding mechanism 10 is set to be in the released state and the process proceeds to step S14. In step S13, since the movement amount of the image pickup device holding frame 8 from the original position in the electrically holding is the movement threshold value or more, the holding mechanism 10 which is set to be in the holding state (see FIG. 15C) to perform the deviation eliminating operation is set to be in the released state. Step S13 is the same as step S1 in the flowchart of FIG. 18 showing Example 1. Thereby, the one end 24a of the oscillating shaft 24 has contact with or abuts on the one end 6b of the opening 6a by the bias of the torsion spring 27 and the positioning engagement pin 26 is pressed in the rotational direction (see arrow A3 of FIG. 8) in the positioning hole 12a of the slidably holding frame 12 so that the fixation lever 22 is positioned in the X-Y plane (see the fixation lever 22 shown by the solid line in FIG. 8).

In step S14, next to setting the holding mechanism 10 to be in the released state in step S13, the holding mechanism 10 is set to be in the holding state and the process proceeds to step S15. In step S14, the holding mechanism 10 which is set to be in the released state in step S13 (see FIG. 15C) is set to be in the holding state. Step S14 is the same as step S2 of the flowchart in FIG. 18 showing Example 1. Thereby, by a guiding operation of the fixing pin 23 and the engagement hole 19, the image pickup device holding frame 8 is moved to the original position in the electrically holding (see FIG. 15A) and the holding mechanism 10 is in the holding state where the fixing pin 23 of the fixation lever 22 is engaged with the engagement hole 19 of the image pickup device holding frame 8 with the maximum pressing force (see FIG. 15C). In steps S13 and S14, the substantial deviation eliminating operation is terminated.

In step S15, next to judging that the movement amount is the movement threshold value or more in step S12 or setting the holding mechanism 10 to be in the holding state in step S14, displaying the image on the displaying device 32 is started and the process in the flowchart is terminated. In step S15, displaying the image on the displaying device 32 is started to set the digital camera 1 to be in the photographable state.

In the digital camera 1 of Example 2, when the electrical power switch is turned on, that is, the digital camera 1 is actuated, and then it is judged that it is necessary to perform the deviation eliminating operation, the substantial deviation eliminating operation is performed (step S12→step S13→step S14). Accordingly, even if the image pickup device holding frame 8 is affected by unexpected large impact or shock before the digital camera 1 is actuated, the image pickup device holding frame 8, that is, image pickup device 7 is capable of being moved from the position in the mechanically holding by the holding mechanism 10 to the original position in the electrically holding. Therefore, when the image blur correction switch is turned on and the holding state is changed from the mechanically holding state to the electrically holding state, image blur is prevented from occurring in the image displayed on the displaying device 32 and the user can be steadily prevented from having a sense of discomfort.

In the digital camera of Example 2, when the electrical power switch is turned on, that is, the digital camera 1 is actuated, and it is judged that it is not necessary to perform the deviation eliminating operation, displaying the image on the displaying device 32 is immediately started (step S12→step S15) so that usability can be improved while the user does not have a sense of discomfort.

Furthermore, in the digital camera 1 of Example 2, if it is judged that it is necessary to perform the deviation eliminating operation, displaying the image on the displaying device 32 is started (step S15) after performing the substantial deviation eliminating operation (step S13 to S14) so that the image blur can be steadily prevented from being recognized by the user as the deviation eliminating operation is performed.

In the digital camera 1 of Example 2, when it is judged that it is necessary to perform the deviation eliminating operation, the substantial deviation eliminating operation is performed (step S12→step S13→step S14). If it is judged that it is not necessary to perform the deviation eliminating operation, the deviation elimination operation is not performed (step S12→step S15), so that the deviation eliminating operation is performed only when needed and therefore the electrical power consumption can be reduced.

In the digital camera 1 of Example 2, when the image blur correction is started by the image blur correction mechanism 9, the image pickup device holding frame 8 (image pickup device 7) is necessarily positioned at the original position in the electrically holding, that is, the center of the image pickup device 7 held by the image pickup device holding frame 8 is positioned on the optical axis. Accordingly, the image blur is appropriately corrected and the image can be prevented from degrading.

In the digital camera 1 of Example 2, when the electrical power switch of the digital camera 1 is turned on and the image blur correction switch is turned off, the fixing pin 23 provided on the one end of the fixation lever 22 is engaged with the engagement hole 19 formed on the image pickup device holding frame 8 to set the holding mechanism to be in the mechanically holding by the image pickup device holding frame 8. Accordingly, the application of electrical current to each coil 16a, 16b of the image blur correction mechanism 9 can be turned off. Thereby, the power consumption can be reduced.

In the digital camera 1 of Example 2, when the lens barrel 4 extends toward the subject side and a predetermined space is formed between the lens barrel 4 and the image pickup device holding frame 8, by the configuration where the one end of the fixation lever 22 is oscillated substantially in the optical axis direction by the operation of the reciprocating mechanism 21, a space where the fixation lever 22 (corresponding to the forcibly pressing plate) is moved toward the side opposite to the object in the optical axis direction from the image pickup device 7 is not required. Thereby, thickness of the lens barrel 4 in the optical axis direction can be reduced.

In the digital camera 1 of Example 2, when the lens barrel 4 extends toward the subject side and a predetermined space is formed between the lens barrel 4 and the image pickup device holding frame 8, by the configuration where the one end of the fixation lever 22 is oscillated substantially in the optical axis direction by the operation of the reciprocating mechanism 21, even in the digital camera having high density package by reducing size, thickness, and the like, the fixation lever 22 capable of oscillating can be provided without interfering with peripheral parts, wires and the like.

Accordingly, in the digital camera 1 of Example 2, the image blur can be prevented from occurring while reducing the power consumption without degrading the image.

In addition, in the above Example 2, in the deviation eliminating operation (steps in FIG. 20) by the holding mechanism 10 (controller 31 controlling the operation thereof), displaying the image on the displaying device 32 is started (step S15) after the substantial deviation eliminating operation (steps S12 to S13 to S14) is performed. However, displaying the image on the displaying device 32 may be started before the substantial deviation eliminating operation is performed (step S15 is firstly performed).

Example 3

Figure 21:
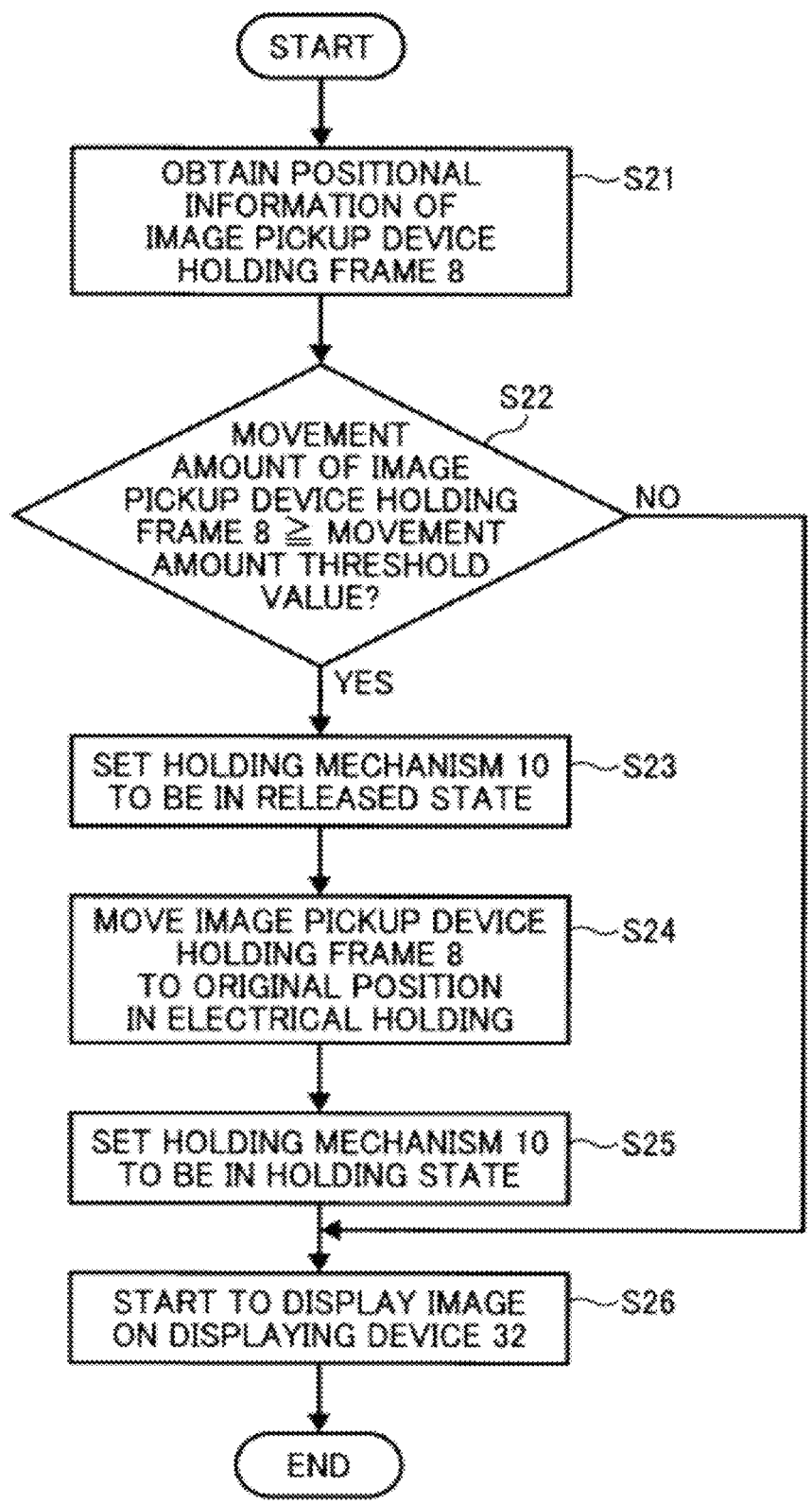
FIG. 21 is a flowchart showing an example of the control process of the deviation eliminating operation in the holding mechanism (controller controlling operations thereof) in the digital camera according to an embodiment of the present invention.

Next, the digital camera 1 (imaging apparatus) according to Example 3 of the present invention will be explained. Example 3 is an example having a different deviation eliminating operation by the holding mechanism 10 (controller 31 controlling the operation thereof). Since the digital camera 1 of Example 3 has a basic configuration similar to the above-described digital camera 1 of Example 1, the same reference numerals are used for the same configuration and detailed explanation will be omitted. FIG. 21 is a flowchart showing an example of the control process of the deviation eliminating operation in the holding mechanism 10 (controller 31 controlling the operation) in the digital camera of Example 3. Hereinafter, each step in the flowchart of FIG. 21 as an example of the control process in the holding mechanism 10 when the deviation eliminating operation is performed will be explained. Steps in this flowchart are started when the electrical power switch of the digital camera 1 is turned on.

In step S21, positional information of the image pickup device holding frame 8 is obtained and the process proceeds to step S22. In step S21, the positional information of the image pickup device holding frame 8 in the X-Y plane is obtained from the position detection device 34 (see FIG. 2) for detecting positions of the image pickup device holding frame 8 and the sliding frame 11. Step S21 is the same as step S11 in the flowchart of FIG. 20 showing Example 2.

In step 22, next to obtaining the positional information of the image pickup device holding frame 8 in step S21, it is judged whether or not the movement amount of the image pickup device holding frame 8 from the original position in the electrically holding is a movement threshold value or more and if "Yes", the process proceeds to step S23, and if "No", the process proceeds to step S26. In step S22, it is judged how much the current position of the image pickup device holding frame 8 is deviated from the original position in the electrically holding, and if the deviated amount is the movement threshold value or more, it is judged that it is necessary to perform the deviation eliminating operation and the process proceeds to step S23. Moreover, if the deviated amount is less than the movement threshold value, it is judged that it is not necessary to perform the deviation eliminating operation, and the process proceeds to step S26 so as to immediately start displaying the image on the displaying device 32. Step S22 is the same as step S12 in the flowchart of FIG. 20 showing Example 2.

In step S23, next to judging that the movement amount in step S22 is the movement threshold value or more, the holding mechanism 10 is set to be in the released state and the process proceeds to step S24. In step S23, since the movement amount of the image pickup device holding frame 8 from the original position in the electrically holding is the movement threshold value or more, the holding mechanism 10 which is set to be in the holding state (see FIG. 15C) to perform the deviation eliminating operation is set to be in the released state. Step S23 is the same as step S1 in the flowchart of FIG. 18 showing Example 1. Thereby, the one end 24a of the oscillating shaft 24 has contact with or abuts on the one end 6b of the opening 6a by the bias of the torsion spring 27 and the positioning engagement pin 26 is pressed in the rotational direction (see arrow A3 of FIG. 8) in the positioning hole 12a of the slidably holding frame 12 so that the fixation lever 22 is positioned in the X-Y plane (see the fixation lever 22 shown by the solid line in FIG. 8).

In step S24, next to setting the holding mechanism 10 to be in the released state in step S23, the image pickup device holding frame 8 is set to be in the original position in the electrically holding and the process proceeds to step S25. In step S24, the image pickup device holding frame 8 (image pickup device 7) is moved to the original position set on the optical axis in the electrically holding state and maintained to be positioned at the original position by the image blur correction mechanism 9. That is, in step S24, the application of electrical current to each coil 16a, 16b is controlled based on data on the original position stored in the memory device 31a (see FIG. 2) to electrically hold the image pickup device holding frame 8 at the original position. At this time, since the holding mechanism 10 is set to be in the released state in step S23, the engagement of the fixing pin 23 of the fixation lever 22 with the engagement hole 19 does not have an importance. Moreover, in step S24, the image pickup device holding frame 8 is positioned at the original position in the electrically holding in step S24. Accordingly, even if the positional deviation (movement amount) in the holding mechanism 10 is the movement threshold value or more (step S21→step S22), the image pickup device holding frame 8 can be positioned at the original position preliminarily set on the optical axis.

In step S25, next to positioning the image pickup device holding frame 8 at the original position by the electrically holding in step S24, the holding mechanism 10 is set to be in the holding state and the process proceeds to step S26. That is, the driving motor 20 is driven to be rotated by predetermined pulses in the reverse direction. Thereby, the cam gear 45 is pressed down so that the fixing pin 23 of the fixation lever 22 is moved close to and then abuts on the engagement hole 19 of the image pickup device holding frame 8 positioned at the original position by the electrically holding. At this time, in the holding mechanism 10, the pressing force of the fixing pin 23 of the fixation lever 22 against the engagement hole 19 of the image pickup device holding frame 8 (image pickup device 7) positioned at the original position by the electrically holding is gradually increased and the friction force affecting between the lower surface 51a of the lever receiving member 51 and the connection portion 22d (upper surface thereof) of the fixation lever 22 is also gradually increased. Therefore, in a case where the holding mechanism 10 is set to be in the released state so that the fixing pin 23 of the fixation lever 22 positioned in the X-Y plane by the bias of the torsion spring 27 is deviated in the optical axis direction (Z axis direction) from the engagement hole 19 of the image pickup device holding frame 8 positioned at the original position by the electrically holding, in a process where the friction force affecting between the lower surface 51a of the lever receiving member 51 and the connection portion 22d (upper surface thereof) of the fixation lever 22 is gradually increased, by a guiding operation of the fixing pin 23 and the engagement hole 19, the fixing pin 23 is moved to a position matching with or corresponding to the engagement hole 19 of the image pickup device holding frame 8 positioned at the original position in the electrically holding (see FIG. 10). Accordingly, in the positional relationship (contact relationship or abutting relationship) of the connection portion 22d (upper surface thereof) of the fixation lever 22 and the lower surface 51a of the lever receiving member 51, the state of the holding mechanism 10 is changed from a positioned state where the fixation lever 22 is positioned by the bias of the torsion spring 27 to an engaged state where the fixing pin 23 is appropriately engaged with the engagement hole 19 of the image pickup device holding frame 8 positioned at the original position by the electrically holding. Therefore the friction force between the connection portion 22d (upper surface thereof) of the fixation lever 22 and the lower surface 51a of the lever receiving member 51 is increased and the fixation lever 22 is fixed in the changed state. Thereby, the image pickup device holding frame 8 (image pickup device 7) is mechanically held at the original position in the electrically holding by the holding mechanism 10. Therefore, steps S23 to S24 to S25 are substantial deviation eliminating operations. When step S25 is terminated, the holding mechanism 10 is set to be in the holding state. That is, the driving motor 20 is driven to be rotated by predetermined pulses in the reverse direction and then the electrically holding by the image blur correction mechanism 9 is stopped, that is, the application of the electrical current to each coil 16*a*, 16*b* is stopped.

In step S26, next to judging that the movement amount is the movement threshold value or more in step S22 or setting the holding mechanism 10 to be in the holding state in step S25, displaying the image on the displaying device 32 is started and the process in the flowchart is terminated. In step S26, displaying the image on the displaying device 32 is started to set the digital camera 1 to be in the photographable state.

In the digital camera 1 of Example 3, when the electrical power switch is turned on, that is, the digital camera 1 is actuated, and then it is judged that it is necessary to perform the deviation eliminating operation, the substantial deviation eliminating operation is performed (step S22→step S23→step S24→step S25). Accordingly, even if the image pickup device holding frame 8 is affected by unexpected large impact or shock before the digital camera 1 is actuated, the image pickup device holding frame 8, that is, image pickup device 7 is capable of being moved from the position in the mechanically holding by the holding mechanism 10 to the original position in the electrically holding. Therefore, when the image blur correction switch is turned on and the holding state is changed from the mechanically holding state to the electrically holding state, image blur is prevented from occurring in the image displayed on the displaying device 32 and the user can be steadily prevented from having a sense of discomfort.

In the digital camera of Example 3, when the electrical power switch is turned on, that is, the digital camera 1 is actuated, and it is judged that it is not necessary to perform the deviation eliminating operation, displaying the image on the displaying device 32 is immediately started (step S22 step S25) so that usability can be improved while the user does not have a sense of discomfort.

Furthermore, in the digital camera 1 of Example 3, the substantial deviation eliminating operation (step S23→step S24→step S25) is performed by setting the holding mechanism 10 to be in the holding state where the image pickup device holding frame 8 is set to be positioned at the original position in the electrically holding after the holding mechanism 10 is set to be in the released state. Accordingly, even if the position of the image pickup device holding frame 8 in the mechanically holding in the holding mechanism 10 by the fixation lever 22 positioned by the bias of the torsion spring 27 is deviated from the original position in the electrically holding by the image blur correction mechanism 9, in the process of setting the holding mechanism 10 to be in the holding state, the position of the image pickup device holding frame 8 in the holding mechanism 10 in the mechanically holding can be set to be in the original position in the electrically holding. Therefore, image blur in the image displayed on the displaying device 32 can be steadily prevented from occurring when the holding state is changed from the mechanically holding to the electrically holding.

In the digital camera 1 of Example 3, if it is judged that it is necessary to perform the deviation eliminating operation, displaying the image on the displaying device 32 is started (step S26) after performing the substantial deviation eliminating operation (step S23 to S24 to S25) so that the image blur can be steadily prevented from being recognized by the user as the deviation eliminating operation is performed.

In the digital camera 1 of Example 3, when it is judged that it is necessary to perform the deviation eliminating operation, the substantial deviation eliminating operation is performed (step S22→step S23→step S24→step S25). If it is judged that it is not necessary to perform the deviation eliminating operation, the deviation elimination operation is not performed (step S22→step S25), so that the deviation eliminating operation is performed only when needed and therefore the electrical power consumption can be reduced.

In the digital camera 1 of Example 3, when the image blur correction is started by the image blur correction mechanism 9, the image pickup device holding frame 8 (image pickup device 7) is necessarily positioned at the original position in the electrically holding, that is, the center of the image pickup device 7 held by the image pickup device holding frame 8 is positioned on the optical axis. Accordingly, the image blur is appropriately corrected and the image can be prevented from degrading.

In the digital camera 1 of Example 3, when the electrical power switch of the digital camera 1 is turned on and the image blur correction switch is turned off, the fixing pin 23 provided on the one end of the fixation lever 22 is engaged with the engagement hole 19 formed on the image pickup device holding frame 8 to set the holding mechanism to be in the mechanically holding by the image pickup device holding frame 8. Accordingly, the application of electrical current to each coil 16*a*, 16*b* of the image blur correction mechanism 9 can be turned off. Thereby, the power consumption can be reduced.

In the digital camera 1 of Example 3, when the lens barrel 4 extends toward the subject side and a predetermined space is formed between the lens barrel 4 and the image pickup device holding frame 8, by the configuration where the one end of the fixation lever 22 is oscillated substantially in the optical axis direction by the operation of the reciprocating mechanism 21, a space where the fixation lever 22 (corresponding to the forcibly pressing plate) is moved toward the side opposite to the object in the optical axis direction from the image pickup device 7 is not required. Thereby, thickness of the lens barrel 4 in the optical axis direction can be reduced.

In the digital camera 1 of Example 3, when the lens barrel 4 extends toward the subject side and a predetermined space is formed between the lens barrel 4 and the image pickup device holding frame 8, by the configuration where the one end of the fixation lever 22 is oscillated substantially in the optical axis direction by the operation of the reciprocating mechanism 21, even in the digital camera having high density package by reducing size, thickness, and the like, the fixation lever 22 capable of oscillating can be provided without interfering with peripheral parts, wires and the like.

Accordingly, in the digital camera 1 of Example 3, the image blur can be prevented from occurring while reducing the power consumption without degrading the image.

In addition, in the above Example 3, in the deviation eliminating operation (steps in FIG. 21) by the holding mechanism 10 (controller 31 controlling the operation thereof), displaying the image on the displaying device 32 is started (step S26) after the substantial deviation eliminating operation (steps S23→S24→S25) is performed. However, displaying the image on the displaying device 32 may be started before the substantial deviation eliminating operation is performed (step S26 is firstly performed).

Example 4

Next, the digital camera 1 (imaging apparatus) according to Example 4 of the present invention will be explained.

Figure 22:
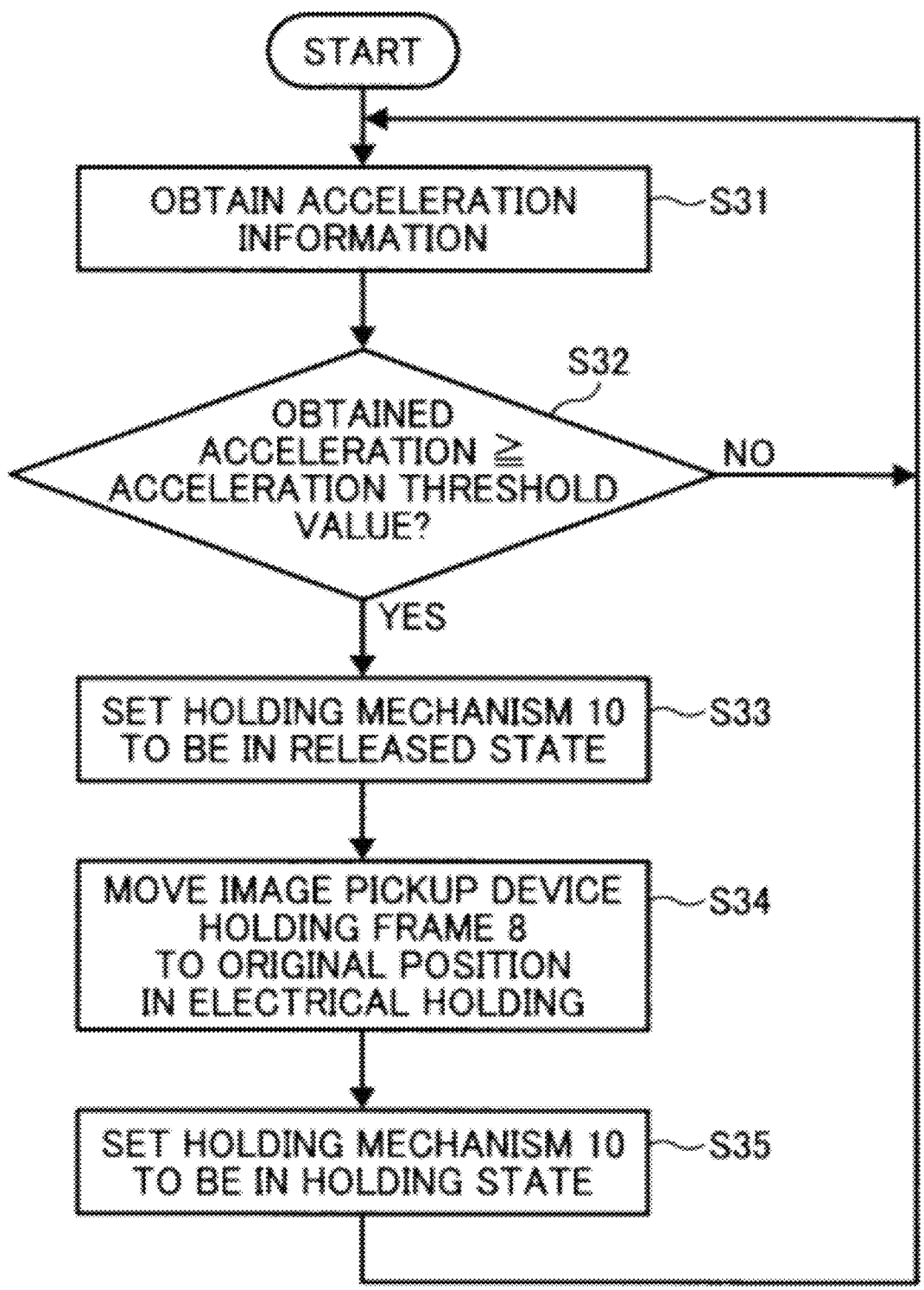
FIG. 22 is a flowchart showing an example of the control process of the deviation eliminating operation in a different case by the holding mechanism (controller controlling operations thereof) in the digital camera according to an embodiment of the present invention.

Example 4 is an example in which the deviation eliminating operation by the holding mechanism 10 (controller 31 controlling the operation thereof) is performed even in a different case. Since the digital camera 1 of Example 4 has a basic configuration similar to the above-described digital camera 1 of Example 1, the same reference numerals are used for the same configuration and detailed explanation will be omitted. FIG. 22 is a flowchart showing an example of the control process of the deviation eliminating operation in a different case by the holding mechanism 10 (controller 31 controlling the operation) in the digital camera of Example 4.

In the digital camera 1 (imaging apparatus) of Example 4, an acceleration sensor as an acceleration detection device 35 (see reference numeral 35 in FIG. 2) for detecting an acceleration due to movement of the digital camera 1 (camera body 2 (body case 2a)) is provided. The acceleration sensor may be commonly used as or separately provided from the camera shake detection device 35 (see FIG. 2) for detecting the camera shake or the image blur occurring when photographing. In Example 4, the acceleration sensor provided as the camera shake detection device 35 (see FIG. 2) is used as the acceleration detection device.

In the digital camera 1 (imaging apparatus) of Example 4, when the electrical power switch of the digital camera 1 is turned on, the holding mechanism 10 (controller 31 for controlling the operations thereof) performs the deviation eliminating operation (flowchart of FIG. 21) as explained above in Example 3. Then, if the digital camera 1 is set to be in the monitoring state, that is, in a state where the electrical power switch of the digital camera 1 is turned on and the image blur correction switch is turned off, the deviation eliminating operation shown in the flowchart of FIG. 22 is repeatedly performed until the monitoring state is released. The monitoring state is released when the electrical power switch of the digital camera 1 is turned off or the image blur correction switch is turned on. Hereinafter, each step in the flowchart of FIG. 22 as an example of the control process in the holding mechanism 10 (controller 31 for controlling operations thereof) when the deviation eliminating operation is performed will be explained.

In step S31, acceleration information from the camera shake detection device 35 is obtained and the process proceeds to step S32. In step S31, the acceleration information in a direction along the X-Y plane is obtained from the camera shake detection device 35 (see FIG. 2) as the above acceleration detection device for detecting an acceleration as the digital camera 1 (camera body 2 (body case 2a)) moves.

In step 32, next to obtaining the acceleration information from the camera shake detection device 35 in step S31, it is judged whether or not the generated acceleration is an acceleration threshold value or more and if "Yes", the process proceeds to step S33, and if "No", the process returns to step S31. In step S32, it is judged how much the acceleration is generated in the digital camera based on the acceleration information from the camera shake detection device 35. and if the acceleration is the acceleration threshold value or more, it is judged that it is necessary to perform the deviation eliminating operation and the process proceeds to step S33. Moreover, if the acceleration is less than the acceleration threshold value, it is judged that it is not necessary to perform the deviation eliminating operation, and the process returns to step S31 so as to obtain further acceleration information. That is, in steps S31 to S32, it is judged whether or not change in movement speed in the direction along the X-Y plane in the digital camera 1 (camera body 2 (body case 2a)) is over the acceleration threshold value. The acceleration threshold value is set to a value at which the image pickup device holding frame 8 is possibly affected by impact or shock enough to deviate the position of the image pickup device holding frame 8 (image pickup device 7) in the mechanically holding state from the original position in the electrically holding due to the change in the movement speed generated in the digital camera 1. In other words, the acceleration threshold value is set to a value at which the image pickup device holding frame 8 is affected by impact or shock more than the combined force (fixing force) of the friction force affecting between the connection portion 22d (upper surface thereof) of the fixation lever 22 and the lower surface 51a of the lever receiving member 51, which is set in the mechanically holding state, and the biasing force from the torsion spring 27 due to the change in the movement speed generated in the digital camera 1.

In step S33, next to judging that the acceleration in step S32 is the acceleration threshold value or more, the holding mechanism 10 is set to be in the released state and the process proceeds to step S34. In step S33, since the acceleration which is the acceleration threshold value or more is generated in the digital camera 1, and the position of the image pickup device holding frame 8 (image pickup device) by the mechanically holding is possibly deviated from the original position in the electrically holding, the holding mechanism 10 which is set to be in the holding state (see FIG. 15C) to perform the deviation eliminating operation is set to be in the released state. Step S33 is the same as step S1 in the flowchart of FIG. 18 showing Example 1. Thereby, the one end 24a of the oscillating shaft 24 has contact with or abuts on the one end 6b of the opening 6a by the bias of the torsion spring 27 and the positioning engagement pin 26 is pressed in the rotational direction (see arrow A3 of FIG. 8) in the positioning hole 12a of the slidably holding frame 12 so that the fixation lever 22 is positioned in the X-Y plane (see the fixation lever 22 shown by the solid line in FIG. 8).

In step S34, next to setting the holding mechanism 10 to be in the released state in step S33, the image pickup device holding frame 8 is set to be in the original position in the electrically holding and the process proceeds to step S35. In step S34, the image pickup device holding frame 8 (image pickup device 7) is moved to the original position set on the optical axis in the electrically holding state and maintained to be positioned at the original position by the image blur correction mechanism 9. That is, in step S34, the application of electrical current to each coil 16a, 16b is controlled based on data on the original position stored in the memory device 31a to electrically hold the image pickup device holding frame 8 at the original position. At this time, since the holding mechanism 10 is set to be in the released state in step S33, the engagement of the fixing pin 23 of the fixation lever 22 with the engagement hole 19 does not have an importance. Moreover, in this example, when the holding mechanism 10 is set to be in the released state in step S33, in step where the friction affecting between the lower surface 51a of the lever receiving member 51 and the connection portion 22d (upper surface thereof) of the fixation lever 22 is gradually decreased, the operation of setting the image pickup device holding frame 8 to be positioned at the original position by the electrically holding in step S34 is performed. This is for prevent the state where the both of mechanically and electrically holding of the image pickup device holding frame 8 are released from occurring.

In step S35, next to positioning the image pickup device holding frame 8 at the original position by the electrically holding in step S34, the holding mechanism 10 is set to be in the holding state and the process returns to step S31. In step S35, the holding mechanism 10 which is set to be in the released state (see FIG. 15C) is set to be in the holding state. Step S35 is the same as step S25 in the flowchart shown in FIG. 21 of Example 3. Thereby, the image pickup device holding frame 8 (image pickup device 7) can be mechanically held at the original position in the electrically holding by the holding mechanism 10. Therefore, steps S33 to S34 to S35 are the substantial deviation eliminating operations. In step S35, the holding mechanism 10 is set to be in the holding state, that is, the driving motor 20 is driven to be rotated by predetermined pulses in the reverse direction, and then the electrically holding operation by the image blur correction mechanism 9 is stopped, that is, the application of the electrical current to each coil 16a, 16b is stopped.

In the digital camera 1 of Example 4, similar to Example 3, since the deviation eliminating operation is performed when the electrical power switch is turned on, that is, the digital camera 1 is actuated, the same advantageous effects as Example 3 can be basically achieved.

In addition, in the digital camera 1 of Example 4, in the monitoring state, when the acceleration which is the acceleration threshold value or more is generated in the digital camera 1 (camera body 2 (body case 2a)), the deviation eliminating operation is performed (step S32→step S33→step S34→step S35). Therefore, even when the digital camera 1 is affected by large impact or shock in the monitoring state, the image pickup device holding frame 8, that is, the image pickup device 7 can be set from the position positioned by mechanically holding by the holding mechanism 10 to the original position in the electrically holding. Therefore, when the image blur correction switch is turned on and the holding state is changed from the mechanically holding state to the electrically holding state, the image blur is prevented from occurring in the image displayed on the displaying device 32 and the user can be steadily prevented from having a sense of discomfort.

In the digital camera 1 of Example 4, in the monitoring state, when the acceleration which is the acceleration threshold value or more is generated in the digital camera 1, the deviation eliminating operation is performed (step S32→step S33→step S34→step S35). Therefore, since, if the acceleration is less than the acceleration threshold value, the deviation elimination operation is not performed (step S32→S31), the deviation eliminating operation can be performed only when needed so that the reduced power consumption can be achieved.

In the digital camera 1 of Example 4, when the holding mechanism 10 is set to be in the released state (step S33), in step where the friction affecting between the lower surface 51a of the lever receiving member 51 and the connection portion 22d (upper surface thereof) of the fixation lever 22 is gradually decreased, the operation of setting the image pickup device holding frame 8 to be positioned at the original position by the electrically holding is performed (step S34). Accordingly, the state where both of the mechanically and electrically holding of the image pickup device holding frame 8 are released can be prevented from occurring so that occurrence of the image blur in the image as the deviation eliminating operation is performed due to generation of the acceleration which is the acceleration threshold value or more in the digital camera 1 in the monitoring state can be reduced.

Accordingly, in the digital camera 1, the image blur can be prevented while the power consumption can be reduced, without degrading image quality.

Moreover in the above described Example 4, when the electrical power switch of the digital camera 1 is turned on, the holding mechanism 10 (controller 31 for controlling the operation thereof) performs the deviation eliminating operation explained in Example 3. However, it is not limited thereto, that is, the deviation eliminating operation explained in Example 1 (flowchart of FIG. 18) or the deviation eliminating operation explained in Example 2 (flowchart of FIG. 20) may be performed.

Although, as described above, the examples are explained, configurations of these examples may be appropriately combined.

Moreover, in the above described examples, the digital camera 1 is explained as an example of the imaging apparatus according to the present invention. However, it may be required only that the imaging apparatus or the electronic device having the imaging apparatus includes the image blur correction mechanism for correcting the camera shake or the image blur by moving the image pickup device in a plane perpendicular to the optical axis of the photographing optical system by electrically holding, the holding mechanism capable of being set to be in a holding state where the holding mechanism mechanically holds the image pickup device, that is, holds the image pickup device by mechanically holding, when the image blur correction mechanism is not operated, the holding mechanism including a positioning mechanism, that the holding mechanism has a positioning mechanism having an elastic member configured to bias the holding member, in the released state, to position the image pickup device from a held position where the image pickup device is held in the holding state to the original position in the electrically holding, and that when the image pickup device is actuated, the deviation eliminating operation in which the holding mechanism is set to be in the released state and then set to be in the holding state is performed. Therefore, the present invention is not limited to the above examples.

Moreover, in the above described examples, although the fixing pin 23 on the end of the fixation lever 22 is engaged with or disengaged from the engagement hole 19 by oscillating the fixation lever 22 as the holding member about the oscillating shaft 24, a part for moving the holding member may be used and the present invention is not limited to the above examples.

Furthermore, in the above described examples, the torsion spring 27 is used as the elastic member. However, it is required only that, in the released state of the holding mechanism 10, the holding member (fixation lever 22) is biased to position the held position of the image pickup device 7 in the holding state of the holding mechanism 10 to the original position in the electrically holding, and the present invention is not limited to the above examples.

In the above described examples, the one end 6b of the opening 6a and the one end 24a of the oscillating shaft 24, the positioning engagement pin 26 and the positioning hole 12a of the slidably holding frame 12 constitute locking devices, respectively. However, it is required only that the holding member (fixation lever 22) is locked at the positioning position, that is, the original position in the electrically holding against the elastic member (torsion spring 27). Therefore, the present invention is not limited to the above examples.

Although the present invention has been described in terms of exemplary embodiments, it is not limited thereto. It should be appreciated that variations may be made in the embodiments described by persons skilled in the art without departing from the scope of the present invention as defined by the following claims.

(Effect of the Invention)

In the imaging apparatus according to an embodiment of the present invention, when the imaging apparatus is actuated, the deviation eliminating operation in which the holding mechanism is set to be in the released state and then set to be in the holding state is performed. Since the holding mechanism is set to be in the released state so that the held position of the image pickup device in the holding state is positioned to the original position in the electrically holding by the positioning mechanism using the bias of the elastic member, and then, the holding mechanism is set to be in the holding state, even if the image pickup device is affected by unexpected large impact or shock before being actuated, the position of the image pickup device in mechanically holding by the holding mechanism can be set to the original position in the electrically holding. Therefore, image blur does not occur in the image when the holding state of the holding mechanism is changed from the mechanically holding to the electrically holding so that a user can be steadily prevented from having a sense of discomfort.

When the image blur correction is started by the image blur correction mechanism, the image pickup device is necessarily set at the original position in the electrically holding so that the image blur can be more appropriately corrected while the image degradation can be prevented.

Further, when the image blur correction mechanism is not operated, the holding mechanism mechanically controls the movement of the image pickup device (that is, in a mechanically holding state) by engagement of the holding member with the image blur correction mechanism. Accordingly, the application of the electrical current to the image blur correction mechanism can be turned off or cut and the power consumption can be reduced.

Furthermore, the positioning mechanism of the holding mechanism uses a bias of the elastic member so that the power consumption can be reduced.

In addition to the above described configuration, the imaging apparatus may include a position detection device for detecting a position of the image pickup device. Based on the detection result from the position detection device, if it is judged that the movement amount of the held position of the image pickup device in the holding state by the holding mechanism from the original position in the electrically holding is the movement threshold value or more, the deviation eliminating operation is performed. Because when the movement amount is the threshold value or more, the deviation eliminating operation is performed, even if the image blur occurs in the image when the holding state of the holding mechanism is changed from the mechanically holding state to the electrically holding state, the movement threshold value is set to a movement amount of the image pickup device such that the user does not have a sense of discomfort so that the deviation eliminating operation is performed as needed.

In addition to the above described configuration, based on the detection result from the position detection device, if it is judged that the movement amount of the held position of the image pickup device in the holding state by the holding mechanism from the original position in the electrically holding is less than the movement threshold value, the deviation eliminating operation is not performed. Because when the movement amount is less than the threshold value, the deviation eliminating operation is not performed, even if the image blur occurs in the image when the holding state of the holding mechanism is changed from the mechanically holding state to the electrically holding state, the movement threshold value is set to a movement amount of the image pickup device such that the user does not have a sense of discomfort so that the deviation eliminating operation is not performed when it is not required and therefore the power consumption can be reduced.

In addition to the above configuration, in the deviation eliminating operation, the image pickup device may be set to be at the original position by the electrically holding by use of the image blur correction mechanism between setting the holding mechanism to be in the released state and setting the holding mechanism to be in the holding state. Even if the held position of the image pickup device in the holding state where the image pickup device is positioned by the positioning mechanism is deviated from the original position in the electrically holding, in step of setting the holding mechanism to be in the holding state, the held position of the image pickup device in the mechanically holding by use of the holding mechanism can be set to the original position in the electrically holding. Therefore, when the holding state of the holding mechanism is changed from the mechanically holding state to the electrically holding state, the image blur can be steadily prevented from occurring in the image.

In addition to the above configuration, the imaging apparatus further may include an acceleration detection device for detecting a change in a movement speed of the imaging apparatus. After the imaging apparatus is actuated and then the deviation eliminating operation is performed, when the image blur correction mechanism is not operated, based on the detection result from the acceleration detection device, if it is judged that the acceleration generated in the imaging apparatus is an acceleration threshold value or more, the deviation eliminating operation is performed. Accordingly, even when the imaging apparatus is affected by large impact or shock, the position of the image pickup device in the mechanically holding by the holding mechanism can be set to the original position in the electrically holding. Therefore, when the holding state is changed from the mechanically holding state to the electrically holding state, image blur does not occur in the image and user can be steadily prevented from having a sense of discomfort.

In addition to the above configuration, the imaging apparatus may further include a displaying device for displaying an image as a subject image obtained by the image pickup device. After the deviation eliminating operation is performed the image as the subject image obtained by the image pickup device is displayed on the displaying device. Accordingly, displaying the image on the displaying device is started after the deviation eliminating operation is performed, so that the image blur occurring when the deviation eliminating operation is performed can be steadily prevented from being recognized by the user.

In addition to the above configuration, the imaging apparatus may further include a displaying device for displaying an image as a subject image obtained by the image pickup device. If the deviation eliminating operation is performed, the subject image obtained by the image pickup device is displayed on the displaying device immediately. Accordingly, when the deviation eliminating operation is not performed, displaying the image on the displaying device is started immediately after the digital camera is actuated, so that user can be prevented from having a sense of discomfort while usability can be improved.

In addition to the above configuration, the image blur correction mechanism may have a frame member movably holding the image pickup device in a plane perpendicular to the optical axis. The holding mechanism may mechanically control the movement of the image pickup device by being engaged with an engagement hole provided on the frame member of the image blur correction mechanism. Accordingly, the holding mechanism performing mechanically holding by the engagement of the holding member can have a simple configuration without influences affecting functions of the image pickup device.

In addition to the above configuration, the image blur correction mechanism may have a base plate configured to movably hold the frame member in the plane perpendicular to the optical axis, an electrical magnet provided on one of the base plate and the frame member, and a permanent magnet provided on the other one of the base plate and the frame member. The controller may control an electrical current applied to the electrical magnet to appropriately provide an attraction repulsive force due to a magnetic force between the permanent magnet and the electrical magnet so as to move the image pickup device so that an image blur is prevented from occurring. Accordingly without influences affecting the functions of the image pickup device, the image blur correction mechanism correcting the camera shake or image blur by use of the electrical holding where the image pickup device is set to be in an arbitral position in the plane perpendicular to the optical axis of the photographing optical system by control of the applied electrical current can have more simple configuration.

In addition to the above configuration, the holding member may have a fixing pin configured to be engaged with the engagement hole provided on the image blur correction mechanism. The holding mechanism may have a holding-member moving device configured to move the holding member such that the fixing pin is engaged with the engagement hole in the holding state and the fixing pin is disengaged with the engagement hole in the released state. The holding-member moving device fixes the holding member in the holding state and releases the fixation of the holding member in the released state. The positioning mechanism has a locking device configured to lock the holding member to control a movement of the holding member in a direction along the plane perpendicular to the optical axis of the photographing optical system. The elastic member biases the holding member, in a direction where the locking device locks the holding member, along the plane perpendicular to the optical axis of the photographing optical system. A fixing force of the holding-member moving device to hold the holding member in the holding state is set to be larger than a biasing force of the elastic member. Accordingly the positioning mechanism in the holding mechanism can have a more simple configuration.

What is claimed is:

1. An imaging apparatus comprising:
   a photographing optical system configured to image a subject image;
   an image pickup device configured to obtain the subject image as electrical signals;
   an image blur correction mechanism configured to control an applied current so as to position and electrically hold the image pickup device at an arbitrary position in a plane perpendicular to an optical axis of the photographing optical system to correct image blur;
   a holding mechanism having a holding member, the holding mechanism having a state capable of being switched between a holding state where the holding member is engaged with the image blur correction mechanism so as to mechanically hold the image pickup device by mechanically controlling a movement of the image pickup device and a released state where the engagement of the holding member with the image blur correction mechanism is released, the holding mechanism being set to the holding state when the image blur correction mechanism is not operated;
   a controller configured to control the image blur correction mechanism and the holding mechanism; and
   a position detection device configured to detect a position of the image pickup device,
   wherein
   the holding mechanism has a positioning mechanism having an elastic member configured to bias the holding member to position the image pickup device from a held position where the image pickup device is held in the holding state to an original position where the image pickup device is to be electrically held by the image blur correction mechanism,
   the controller executes a deviation eliminating operation in which the holding mechanism is set to have the released state when the imaging apparatus is actuated and thereafter the holding mechanism is set to the holding state,
   the controller judges whether or not a movement amount of the image pickup device from the held position to the original position is a threshold amount or more, based on output from the position detection device, and
   the controller executes the deviation eliminating operation if it is judged that the movement amount of the image pickup device is the threshold amount or more.

2. The imaging apparatus according to claim 1, wherein
   the controller do not executes the deviation eliminating operation if it is judged that the movement amount of the image pickup device is less than the threshold amount.

3. The imaging apparatus according to claim 1, wherein
   in the deviation eliminating operation, the image pickup device is electrically held by the image blur correction mechanism at the original position between when the holding mechanism is set to have the released state and when the holding mechanism is set to have the holding state.

4. The imaging apparatus according to claim 1, further comprising:
   an acceleration detection device configured to detect a change in a movement speed of the imaging apparatus, wherein
   the controller judges whether or not an acceleration of the imaging apparatus is an acceleration threshold value or more, based on detection result of the acceleration detection device; and
   the controller executes the deviation eliminating operation if the acceleration of the imaging apparatus is the acceleration threshold value or more, after the imaging apparatus is actuated and then the controller executes the deviation eliminating operation and when the image blur correction mechanism is not operated.

5. The imaging apparatus according to claim 1, further comprising:
   a displaying device configured to display an image based on the subject image obtained by the image pickup device, wherein
   the displaying device displays the image based on the subject image obtained by the image pickup device after the controller executes the deviation eliminating operation.

6. The imaging apparatus according to claim 1, further comprising:
   a displaying device configured to display an image based on the subject image obtained by the image pickup device, wherein
   the displaying device immediately displays the image based on the subject image obtained by the image pickup device if the controller does not execute the deviation eliminating operation.

7. The imaging apparatus according to claim 1, wherein
the image blur correction mechanism has a frame member configured to movably hold the image pickup device in the plane perpendicular to the optical axis, the frame member having an engagement hole;
the holding mechanism is engaged with the engagement hole of the frame member of the image blur correction mechanism to mechanically control the movement of the image pickup device.

8. The imaging apparatus according to claim 7, wherein the image blur correction mechanism has
- a base plate configured to movably hold the frame member in the plane perpendicular to the optical axis,
- an electrical magnet provided on one of the base plate and the frame member, and
- a permanent magnet provided on the other one of the base plate and the frame member;

the controller controls a current applied to the electrical magnet to appropriately provide an attraction repulsive force due to a magnetic force between the permanent magnet and the electrical magnet so as to move the image pickup device so that an image blur is prevented from occurring.

9. The imaging apparatus according to claim 1, wherein
the image blur correction mechanism has an engagement hole;
the holding member has a fixing pin configured to be engaged with the engagement hole and a holding-member moving device configured to move the holding member so that the fixing pin is separated from the engagement hole in the released state;
the holding-member moving device fixes the holding member in the holding state and releases the fixation of the holding member in the released state;
the positioning mechanism has a locking device configured to lock the holding member to control a movement of the holding member in a direction along the plane perpendicular to the optical axis of the photographing optical system;
the elastic member biases the holding member, in a direction where the locking device locks the holding member, along the plane perpendicular to the optical axis of the photographing optical system; and
a fixing force of the holding-member moving device to hold the holding member in the holding state is set to be larger than a biasing force of the elastic member.

10. An electronic device on which the imaging apparatus according to claim 1 is mounted.

* * * * *